United States Patent
Frei et al.

(10) Patent No.: US 9,630,375 B2
(45) Date of Patent: *Apr. 25, 2017

(54) FORM, FILL, AND SEAL BAGS AND METHOD OF PRODUCTION

(71) Applicant: Volm Companies, Inc., Antigo, WI (US)

(72) Inventors: Robert Frei, Antigo, WI (US); Corbett Hefner, Antigo, WI (US); Friedrich Landertshamer, Ofering (AT)

(73) Assignee: Volm Companies, Inc., Antigo, WI (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/798,596

(22) Filed: Mar. 13, 2013

(65) Prior Publication Data
US 2013/0188893 A1 Jul. 25, 2013

Related U.S. Application Data

(62) Division of application No. 12/899,771, filed on Oct. 7, 2010, now Pat. No. 8,784,967.
(Continued)

(51) Int. Cl.
*B65D 30/04* (2006.01)
*B32B 5/12* (2006.01)
(Continued)

(52) U.S. Cl.
CPC ............... *B32B 5/12* (2013.01); *B32B 5/022* (2013.01); *B32B 5/06* (2013.01); *B32B 5/08* (2013.01);
(Continued)

(58) Field of Classification Search
CPC . D04H 3/04; D04H 3/14; B65D 29/00; B65D 29/04; B65D 29/02
(Continued)

(56) References Cited

U.S. PATENT DOCUMENTS 1,822,948 A 9/1931 Armstrong
1,872,640 A 4/1932 Pink
(Continued)

FOREIGN PATENT DOCUMENTS

AU 4665372 3/1974
CA 717366 7/1965
(Continued)

OTHER PUBLICATIONS

Atlanta Nisseki Claf, Inc., Typical Physical Properties, www.clafusa.com/properties_metric_print.html, 2007.
(Continued)

*Primary Examiner* — Nathan J Newhouse
*Assistant Examiner* — Derek Battisti
(74) *Attorney, Agent, or Firm* — Boyle Fredrickson, S.C.

(57) ABSTRACT

A form fill and seal (FFS) bag is formed at least in part from an open mesh material that includes filaments that intersect one another. At least some of the filaments are composite filaments having a carrier portion of a relatively high melting point and a bonding portion of a relatively low melting point, the bonding portion of each composite filament being thermally bonded to other filaments at points of intersection. The material may be a non-woven fabric that contains at least two layers of weft filaments that may be bordered on one or both sides by a layer of warp filaments. When compared to other open mesh materials, the open mesh material disclosed herein has a superior combination of some or all of high strength, light weight, high dimensional stability, and openness. Also disclosed herein are methods of making such a bag.

30 Claims, 22 Drawing Sheets

Related U.S. Application Data

(60) Provisional application No. 61/250,299, filed on Oct. 9, 2009, provisional application No. 61/303,290, filed on Feb. 10, 2010, provisional application No. 61/305,003, filed on Feb. 16, 2010, provisional application No. 61/326,069, filed on Apr. 20, 2010.

(51) Int. Cl.
*B32B 5/02* (2006.01)
*B32B 5/06* (2006.01)
*B32B 5/08* (2006.01)
*B32B 5/10* (2006.01)
*B32B 5/26* (2006.01)
*D04H 3/04* (2012.01)
*D04H 3/14* (2012.01)
*B65D 30/00* (2006.01)
*B32B 5/22* (2006.01)
*B32B 1/02* (2006.01)

(52) U.S. Cl.
CPC ............. *B32B 5/10* (2013.01); *B32B 5/22* (2013.01); *B32B 5/26* (2013.01); *B65D 29/00* (2013.01); *D04H 3/04* (2013.01); *D04H 3/14* (2013.01); *B32B 1/02* (2013.01); *B32B 2250/04* (2013.01); *B32B 2250/20* (2013.01); *B32B 2250/242* (2013.01); *B32B 2260/023* (2013.01); *B32B 2262/0253* (2013.01); *B32B 2262/12* (2013.01); *B32B 2305/38* (2013.01); *B32B 2307/50* (2013.01); *B32B 2307/5825* (2013.01); *B32B 2307/718* (2013.01); *B32B 2323/043* (2013.01); *B32B 2439/06* (2013.01); *B32B 2439/46* (2013.01); *Y10T 428/1334* (2015.01); *Y10T 428/24091* (2015.01); *Y10T 428/24099* (2015.01); *Y10T 428/24124* (2015.01); *Y10T 442/184* (2015.04); *Y10T 442/186* (2015.04)

(58) Field of Classification Search
USPC ........................................... 383/117
See application file for complete search history.

(56) References Cited

U.S. PATENT DOCUMENTS

| | | |
|---|---|---|
| 1,906,500 A | 5/1933 | Twitchell |
| 2,056,804 A | 10/1936 | Potdevin |
| 2,085,365 A | 6/1937 | Israel |
| 2,298,421 A | 10/1942 | Salfisberg |
| 2,588,695 A | 3/1952 | Brady et al. |
| 2,668,769 A | 2/1954 | Schlienz |
| 2,689,678 A | 9/1954 | Wendt |
| 2,774,402 A | 12/1956 | Wikle |
| 2,853,225 A | 9/1958 | Bauer |
| 3,015,918 A | 1/1962 | Schoen |
| 3,123,279 A | 3/1964 | Day |
| 3,255,951 A | 6/1966 | Kay |
| 3,257,915 A | 6/1966 | Cartier et al. |
| 3,279,511 A | 10/1966 | Griffin, Jr. |
| 3,402,749 A | 9/1968 | Kinzler |
| 3,506,185 A | 4/1970 | Christensen |
| 3,554,368 A | 1/1971 | Nagel |
| 3,611,657 A | 10/1971 | Inoue et al. |
| 3,646,723 A | 3/1972 | Meroney |
| 3,721,603 A | 3/1973 | Takeda |
| 3,734,812 A | 5/1973 | Yazawa |
| 3,950,583 A | 4/1976 | Patin |
| 3,970,503 A | 7/1976 | Yoshimura |
| 4,074,504 A | 2/1978 | Greenawalt et al. |
| 4,080,232 A | 3/1978 | Friedrich |
| 4,091,595 A | 5/1978 | Pelster et al. |
| 4,207,983 A | 6/1980 | Wolske |
| 4,274,539 A | 6/1981 | Rabeneck et al. |
| 4,279,344 A | 7/1981 | Holloway, Jr. |
| 4,291,082 A | 9/1981 | Stall |
| 4,403,637 A * | 9/1983 | Sabater et al. .............. 383/9 |
| 4,411,722 A | 10/1983 | Yazawa et al. |
| 4,489,630 A | 12/1984 | Okada et al. |
| 4,491,217 A | 1/1985 | Weder et al. |
| 4,597,818 A | 7/1986 | Aoyama et al. |
| 4,700,755 A | 10/1987 | Banys |
| 4,715,167 A | 12/1987 | Savigny |
| 4,722,857 A | 2/1988 | Tomioka et al. |
| 4,975,469 A | 12/1990 | Jacoby et al. |
| 4,988,213 A | 1/1991 | Mattle |
| 4,992,124 A | 2/1991 | Kurihara et al. |
| 5,032,442 A | 7/1991 | Yamazaki et al. |
| 5,073,436 A | 12/1991 | Antonacci et al. |
| 5,114,787 A | 5/1992 | Chaplin et al. |
| 5,151,146 A | 9/1992 | Green |
| 5,169,712 A | 12/1992 | Tapp |
| 5,173,356 A | 12/1992 | Eaton et al. |
| 5,176,953 A | 1/1993 | Jacoby et al. |
| 5,182,162 A | 1/1993 | Andrusko |
| 5,187,005 A | 2/1993 | Stahle et al. |
| 5,208,098 A | 5/1993 | Stover |
| 5,232,533 A | 8/1993 | Tani et al. |
| 5,236,963 A | 8/1993 | Jacoby et al. |
| 5,240,160 A | 8/1993 | Okada et al. |
| 5,244,724 A | 9/1993 | Antonacci et al. |
| 5,255,497 A | 10/1993 | Zoromski et al. |
| 5,259,097 A | 11/1993 | Aihara et al. |
| 5,265,506 A | 11/1993 | Aihara et al. |
| 5,290,377 A | 3/1994 | Aihara et al. |
| 5,300,166 A | 4/1994 | Aihara et al. |
| 5,300,345 A | 4/1994 | Aihara et al. |
| 5,308,424 A | 5/1994 | Sasaki et al. |
| 5,312,500 A | 5/1994 | Kurihara et al. |
| 5,313,863 A | 5/1994 | Aihara et al. |
| 5,317,035 A | 5/1994 | Jacoby et al. |
| 5,358,356 A | 10/1994 | Romanek et al. |
| D360,797 S | 8/1995 | Evans |
| 5,546,732 A | 8/1996 | Coleman et al. |
| 5,594,070 A | 1/1997 | Jacoby et al. |
| 5,645,933 A | 7/1997 | Sakazume et al. |
| 5,702,798 A | 12/1997 | Sugita et al. |
| 5,729,878 A | 3/1998 | Kurihara et al. |
| 5,741,076 A | 4/1998 | Cammack |
| 5,769,993 A | 6/1998 | Baldauf |
| 5,771,664 A | 6/1998 | Recchia, Jr. |
| 5,789,328 A | 8/1998 | Kurihara et al. |
| 5,791,030 A | 8/1998 | Aihara et al. |
| 5,799,465 A | 9/1998 | Townsend |
| 5,802,817 A | 9/1998 | Hood |
| 5,823,683 A | 10/1998 | Antonacci et al. |
| 5,840,633 A | 11/1998 | Kurihara et al. |
| 5,861,202 A | 1/1999 | Kimura et al. |
| 5,882,120 A | 3/1999 | Bell |
| 5,912,197 A | 6/1999 | Madderom |
| 5,942,451 A | 8/1999 | Daponte et al. |
| 5,942,452 A | 8/1999 | Daponte et al. |
| 5,954,914 A | 9/1999 | Aihara |
| 5,957,583 A | 9/1999 | DeClements, Jr. et al. |
| 6,003,581 A | 12/1999 | Aihara |
| 6,015,373 A | 1/2000 | Henderson et al. |
| 6,020,275 A | 2/2000 | Stevenson et al. |
| 6,024,489 A | 2/2000 | Fox et al. |
| 6,030,120 A | 2/2000 | Fox et al. |
| 6,033,112 A | 3/2000 | Sorenson et al. |
| 6,033,509 A | 3/2000 | Miyamoto et al. |
| 6,048,808 A | 4/2000 | Kurihara et al. |
| 6,054,086 A | 4/2000 | Kurihara et al. |
| 6,058,681 A | 5/2000 | Recchia, Jr. |
| 6,106,924 A | 8/2000 | Yamazaki |
| 6,124,001 A | 9/2000 | Sugita et al. |
| 6,127,293 A | 10/2000 | Kimura et al. |
| 6,132,661 A | 10/2000 | Kurihara et al. |
| 6,183,835 B1 | 2/2001 | Cho et al. |
| 6,185,908 B1 | 2/2001 | Madderom |
| 6,190,044 B1 | 2/2001 | Fox et al. |
| 6,201,079 B1 | 3/2001 | Streeky et al. |

(56) References Cited

U.S. PATENT DOCUMENTS

| | | |
|---|---|---|
| 6,371,645 B1 | 4/2002 | Rusert et al. |
| 6,416,220 B1 | 7/2002 | Fox et al. |
| 6,506,429 B1 | 1/2003 | Recchia, Jr. |
| 6,511,625 B1 | 1/2003 | Kuroiwa et al. |
| 6,534,137 B1 | 3/2003 | Vadhar |
| 6,626,570 B2 | 9/2003 | Fox et al. |
| 6,673,186 B2 | 1/2004 | Ishida et al. |
| 6,761,012 B2 | 7/2004 | Rusert et al. |
| 6,767,012 B2 | 7/2004 | Sasamoto |
| 6,866,620 B2 | 3/2005 | Friedman |
| 6,932,510 B2 | 8/2005 | Sway et al. |
| 6,960,394 B2 | 11/2005 | Graham et al. |
| 6,973,702 B2 | 12/2005 | Harashige |
| 6,974,406 B2 | 12/2005 | Antonacci |
| 6,984,350 B2 | 1/2006 | Kuroiwa et al. |
| 7,163,339 B1 | 1/2007 | Hefner |
| 7,356,979 B2 | 4/2008 | Pannekeet |
| 7,640,715 B2 | 1/2010 | Hefner et al. |
| 7,650,994 B2 * | 1/2010 | Ninomiya et al. ............ 206/438 |
| 7,798,715 B2 | 9/2010 | Hefner |
| 8,784,967 B2 | 7/2014 | Frei et al. |
| 8,784,969 B2 | 7/2014 | Landertshamer |
| 9,339,986 B2 | 5/2016 | Frei et al. |
| 2001/0019638 A1 | 9/2001 | Fox et al. |
| 2001/0036496 A1 | 11/2001 | Recchia, Jr. |
| 2002/0068116 A1 | 6/2002 | Recchia, Jr. |
| 2004/0032992 A1 | 2/2004 | Hershku |
| 2005/0054248 A1 | 3/2005 | Philp et al. |
| 2005/0147331 A1 * | 7/2005 | Sway et al. .................... 383/117 |
| 2008/0045109 A1 | 2/2008 | Ogata et al. |
| 2009/0200198 A1 * | 8/2009 | Guelzow et al. ............ 206/570 |
| 2010/0247936 A1 * | 9/2010 | Chang et al. ............. 428/476.3 |
| 2013/0071049 A1 * | 3/2013 | Arning et al. ................ 383/107 |
| 2013/0196098 A1 | 8/2013 | Frei et al. |
| 2014/0349063 A1 | 11/2014 | Frei et al. |
| 2015/0052857 A1 | 2/2015 | Hefner et al. |

FOREIGN PATENT DOCUMENTS

| | | |
|---|---|---|
| CA | 1026522 | 2/1978 |
| DE | 26 36 821 A1 | 2/1978 |
| DE | 33 00 573 A1 | 7/1983 |
| EP | 0 091 681 A2 | 10/1983 |
| EP | 0 344 318 A1 | 12/1989 |
| EP | 0 788 974 A2 | 8/1997 |
| EP | 0 677 450 B1 | 6/1998 |
| EP | 0 891 927 A1 | 1/1999 |
| EP | 0 788 974 B1 | 5/2000 |
| EP | 0 997 562 A2 | 5/2000 |
| EP | 1 739 220 A1 | 1/2007 |
| ES | 1033033 | 7/1996 |
| ES | 2104493 A1 | 10/1997 |
| FR | 2 584 651 A1 | 1/1987 |
| FR | 2 319 485 | 2/1997 |
| GB | 2 309 956 A | 8/1997 |
| JP | 51106619 A | 9/1976 |
| JP | 58114673 U | 8/1983 |
| JP | 59138540 A | 8/1984 |
| JP | 59175037 A | 10/1984 |
| JP | 2045359 A | 2/1990 |
| JP | 3180560 A | 8/1991 |
| JP | 5314711 A | 11/1993 |
| JP | 9202336 A | 8/1997 |
| JP | 10018146 A | 1/1998 |
| JP | 11049182 A | 2/1999 |
| JP | 11130089 A | 5/1999 |
| JP | 11180451 A | 7/1999 |
| JP | 2000085796 A | 3/2000 |
| JP | 2000128190 A | 5/2000 |
| JP | 2000142712 A | 5/2000 |
| JP | 2001055244 A | 2/2001 |
| JP | 2001181954 A | 7/2001 |
| NL | 38062 | 4/1936 |
| WO | 96/32240 A1 | 10/1996 |
| WO | 99/15418 A1 | 4/1999 |
| WO | 99/58323 | 11/1999 |
| WO | 03/045802 | 6/2003 |
| WO | 2010/081179 A2 | 7/2010 |

OTHER PUBLICATIONS

Preliminary rejection with abridged English translation thereof for Japanese Patent Application No. 180934/2010.

* cited by examiner

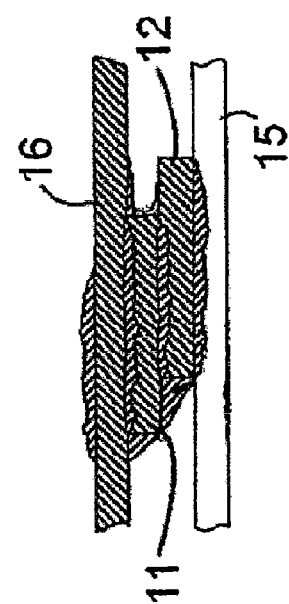
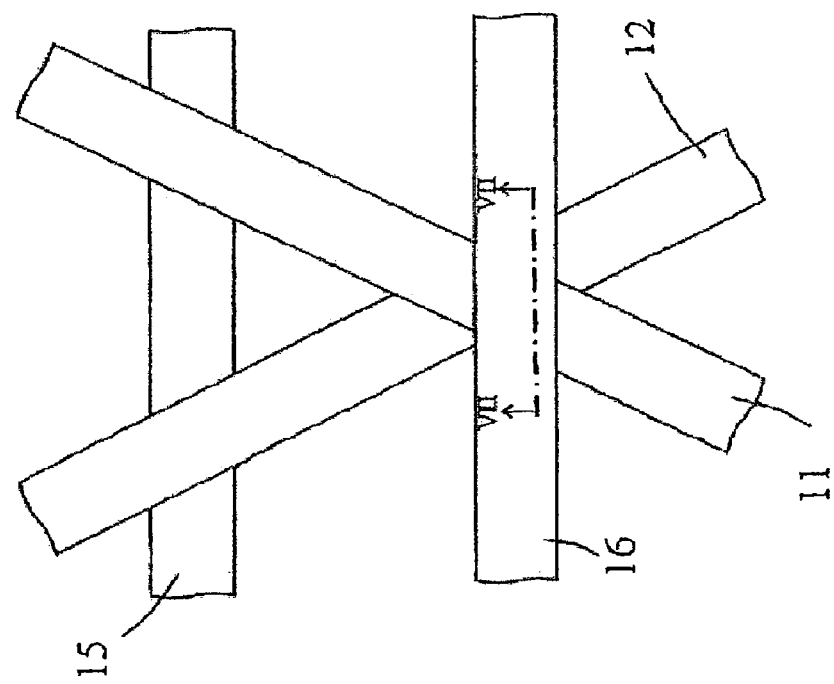

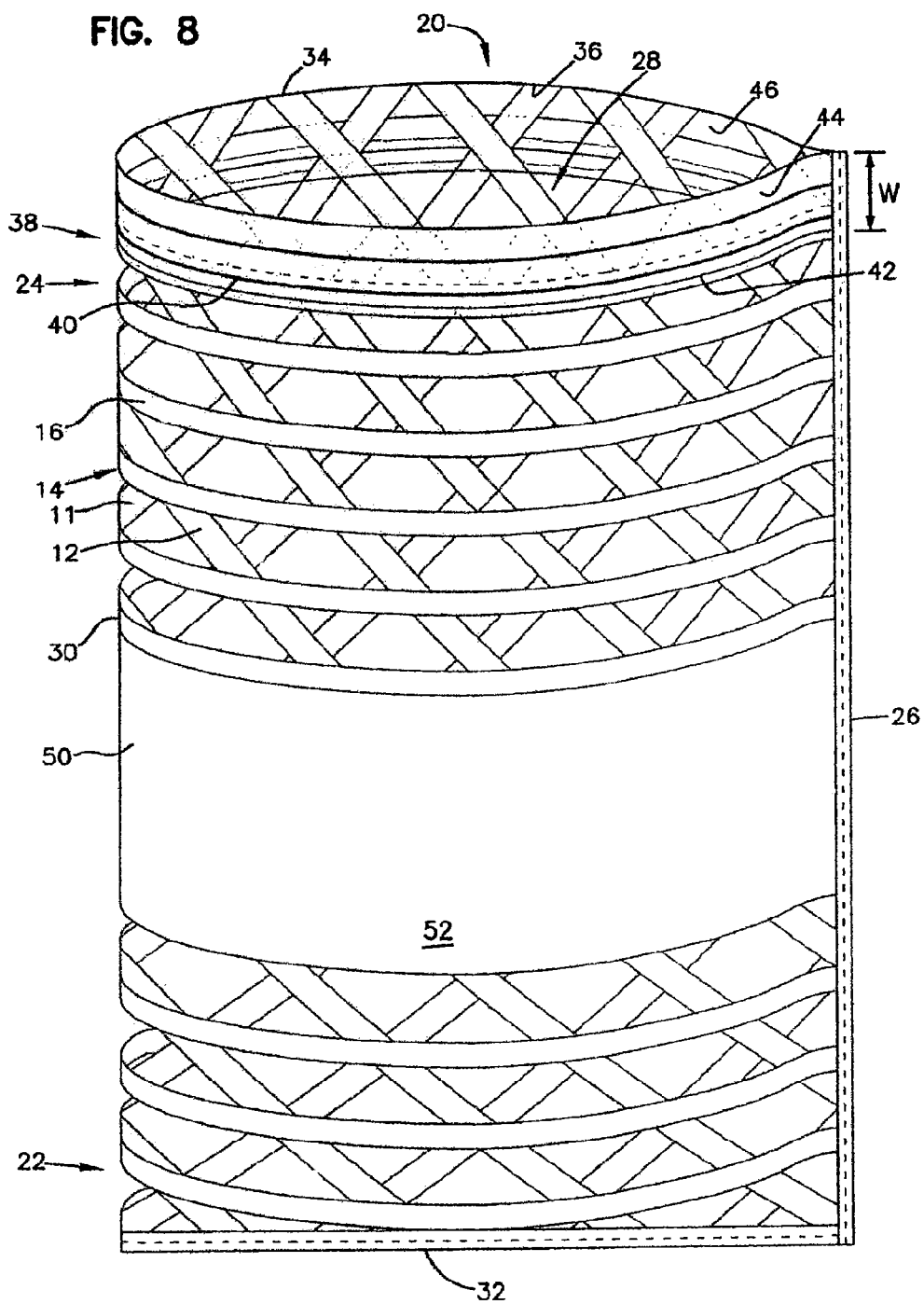

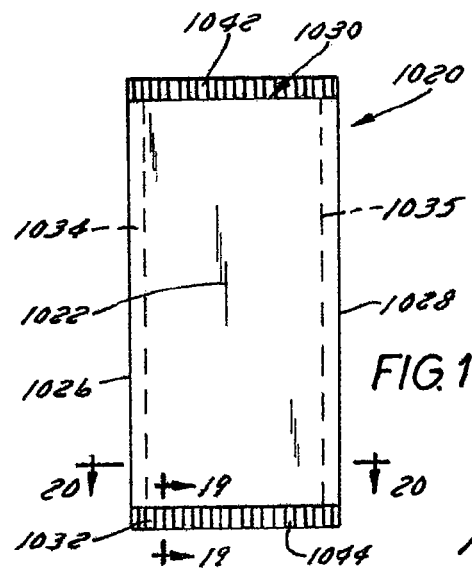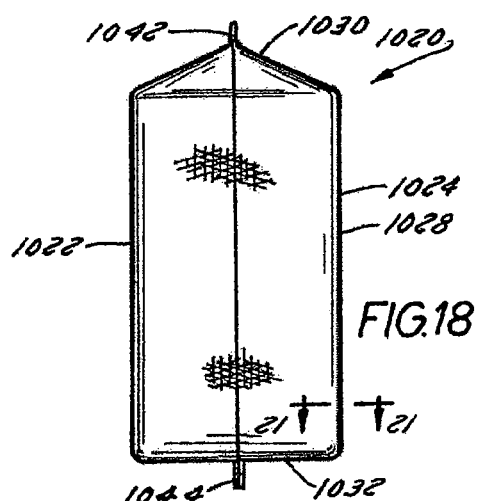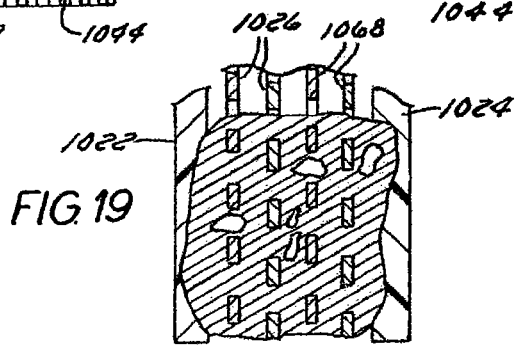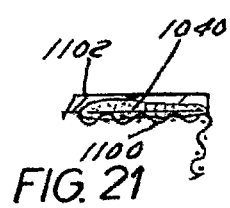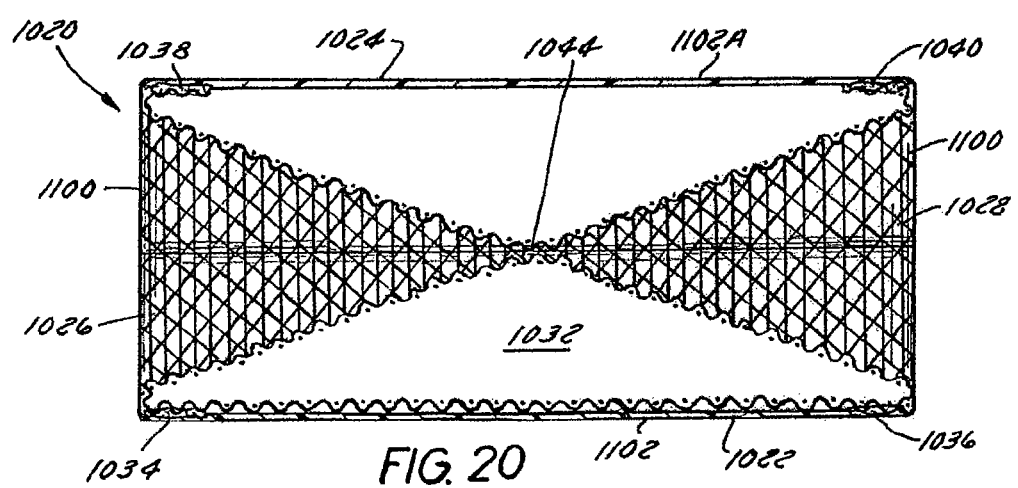

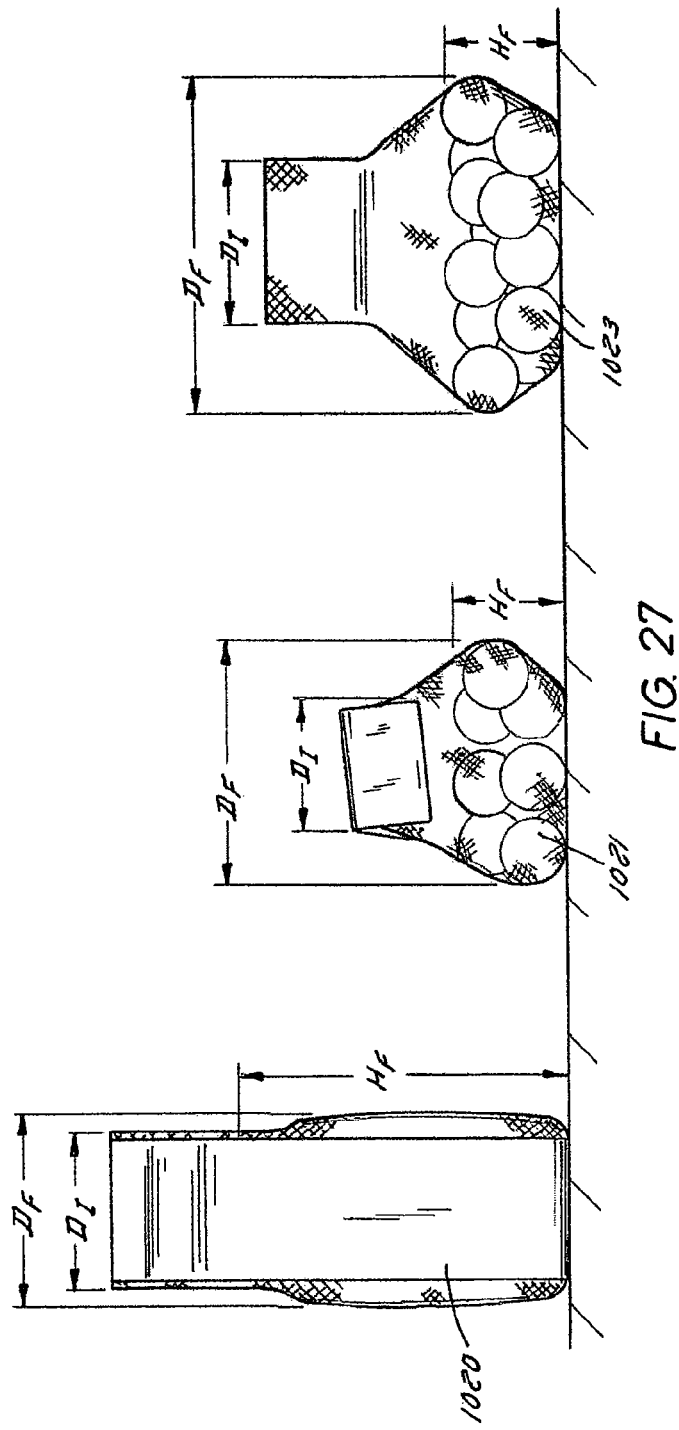

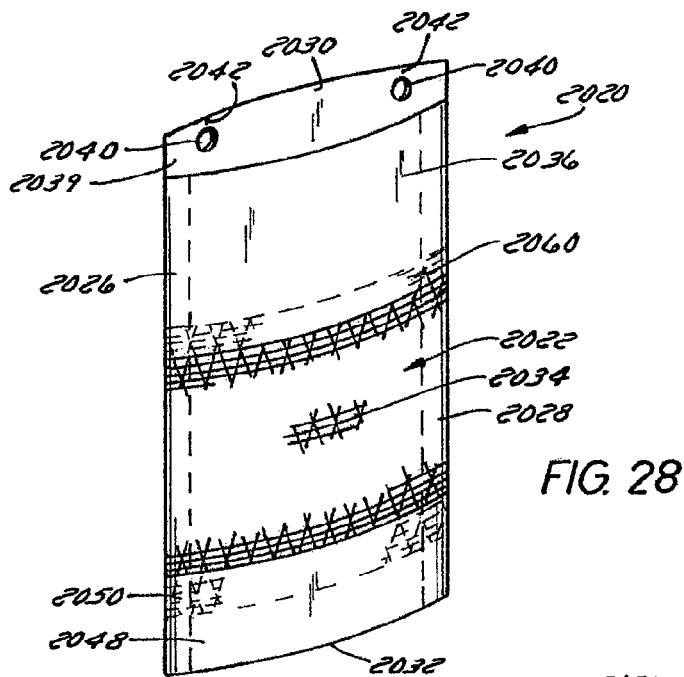
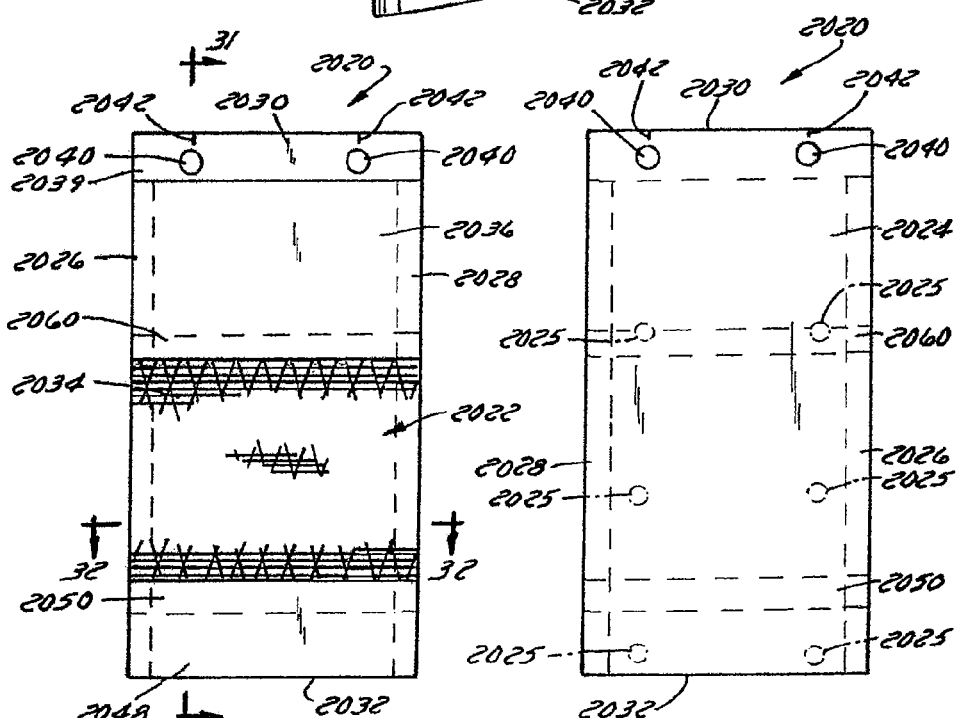

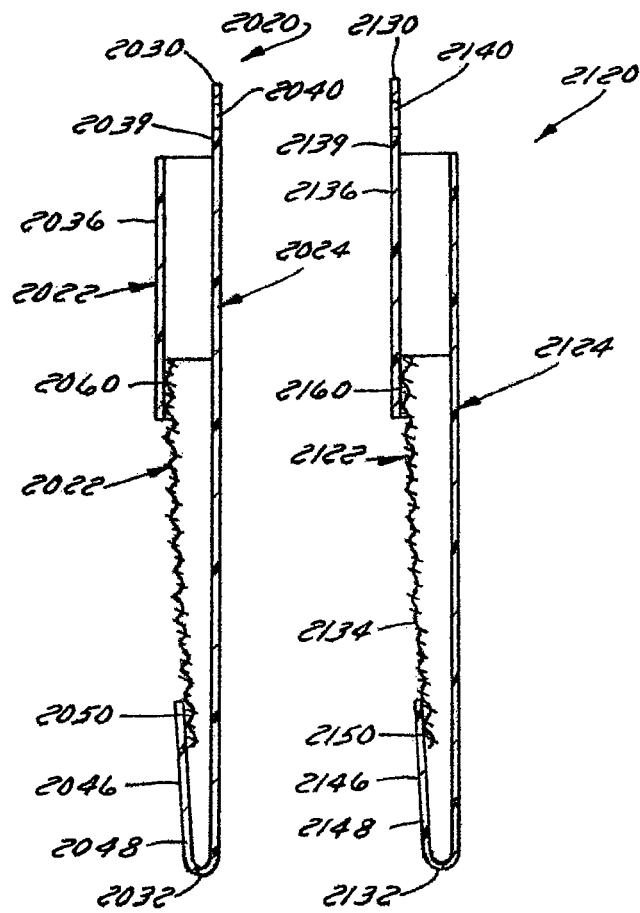
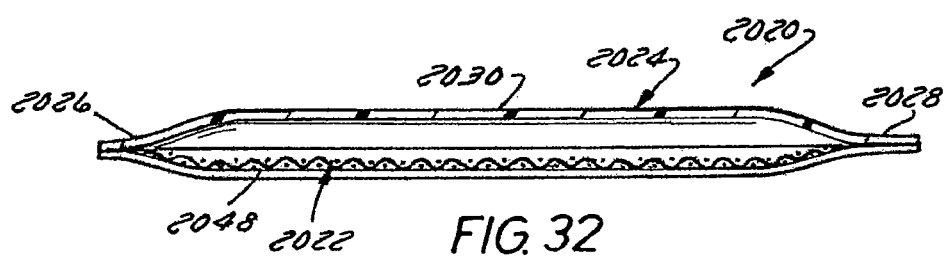
FIG. 31    FIG. 31A
FIG. 32

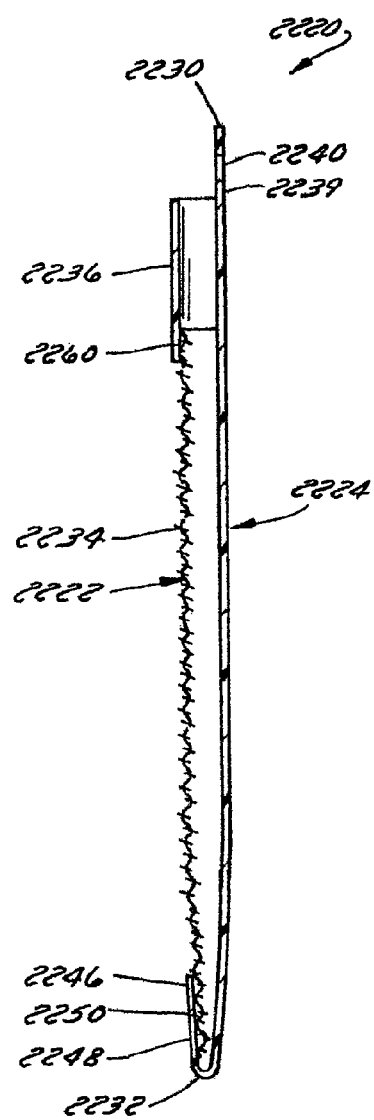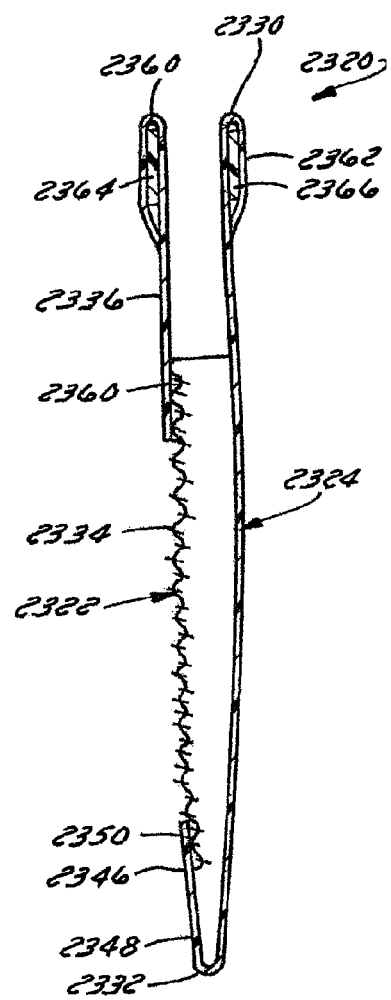
FIG. 31B
FIG. 31C

FORM, FILL, AND SEAL BAGS AND METHOD OF PRODUCTION

CROSS-REFERENCE TO RELATED APPLICATIONS

This non-provisional application is a divisional of U.S. patent application Ser. No. 12/899,771, entitled Open Mesh Material and Bags Made Therefrom, which claims benefit under 35 U.S.C. section 119(e) to the following U.S. provisional and non-provisional patent applications, all of which are hereby incorporated by reference in their entirety:
U.S. Provisional Patent Application Ser. No. 61/250,299, filed Oct. 9, 2009, and entitled Open Mesh Non-Woven Fabric;
U.S. Provisional Patent Application Ser. No. 61/303,290, filed Feb. 10, 2010, and entitled Open Mesh Non-Woven Fabric;
U.S. Provisional Patent Application Ser. No. 61/305,003, filed Feb. 16, 2010, and entitled Multi-Substrate Bag and Method of its Production;
U.S. Provisional Patent Application Ser. No. 61/326,069, filed Apr. 20, 2010, and entitled Multi-Substrate Bag and Method of its Production;
U.S. Non-Provisional patent application Ser. No. 12/899, 771, filed Oct. 7, 2010, and entitled Multi-Substrate Bag and Method of its Production.

BACKGROUND OF THE INVENTION

Field of the Invention

The invention relates to bags formed at least in part from open mesh materials and, more particularly, relates to form fill and seal (FFS) bags formed at least in part from an open mesh material formed from filaments, at least some of which are composite filaments that are thermally bondable to other filaments at at least some points of intersection. The invention additionally relates to methods of making those bags.

Description of Related Art

Synthetic open mesh materials are used in a wide variety of applications, including bags, silt fences and other barriers, bale wraps, and screens. These materials are formed with an open mesh pattern. Traditional mesh materials took the form of crossing threads or filaments that were woven or knitted together without bonding the filaments at their points of intersection. More recently, synthetic cross-laminated films have been introduced in which adjacent layers of slit and bi-axially stretched sheets are secured to each other through thermal bonding rather than through weaving or knitting. Many of the prior art open mesh materials lack dimensional stability. That is, they stretch relatively easily so that, when used in applications such as bags, they expand or bulge undesirably under the weight of the items in the bag. These materials also tend to be relatively weak. Other materials offer better dimensional stability or strength but are relatively heavy on a per area basis. These prior art materials are also relatively expensive to manufacture. Their range of applications also is limited due to limitations on possible variations of material properties.

SUMMARY OF THE INVENTION

In accordance with the first aspect of the invention, a form fill and seal (FFS) bag is formed at least in part from an open mesh material includes filaments that intersect one another, at least some of the filaments being composite filaments having a carrier portion of a relatively high melting point and a bonding portion of a relatively low melting point, the bonding portion of each composite filament being thermally bonded to other filaments at at least some points of intersection. The open mesh material has a mass per unit area of less than 30 g/m$^2$. In other embodiments the open mesh material has a mass per unit area of less than 25 g/m$^2$, less than 20 g/m$^2$, and even less than 15 g/m$^2$.

The open mesh material may extend in machine and cross machine directions and may have a strength-to-mass ratio in at least one of the machine and cross machine directions of at least 2.67 N/(g/m$^2$), where strength is measured in accordance with ASTM standard D 5034. In other embodiments, the strength-to-mass ratio may exceed 3.30 N/(g/m$^2$) or even 4.45 N/(g/m$^2$).

The open mesh material may have a percent elongation in at least one of the machine and cross machine directions of no more than about 50%, where percent elongation is measured in accordance with ASTM standard D 5034. In other embodiments, the breaking elongation may be no more than 40% or no more than 30%.

The open mesh material may have has a mass per unit area of less than 20 g/m$^2$ and a burst strength of at least 80 kPa, where burst strength is measured in accordance with ASTM standard D 3786. In other embodiments the burst strength may exceed 100 kPa and even 150 kPa.

The open mesh material may have a tear strength at the points of intersection of over 10 N, where tear strength is stated in terms of material breaking force. In other embodiments the tear strength may be more than 15 N and even more than 20 N.

While the desired characteristics of the open mesh material in terms of weight per unit area, strength-to-mass ratio, percent elongation, etc., may vary depending on the intended end use of the material, the material of the present disclosure has a low mass per unit area and a high strength-to-mass ratio while maintaining good dimensional stability. This low mass per unit area and high strength-to-mass ratio of the material reduces the carbon footprint associated with manufacturing, transporting, and disposing of products made from the material, such as produce bags, because the products require fewer raw materials and take up less volume. They therefore require less energy for their production and handling than products made from traditional materials.

In one configuration, the material is a non-woven fabric that contains at least two layers of weft filaments that may be bordered on one or both sides by a layer of warp filaments. The weft filaments cross one another at an acute angle to form a generally diamond shaped pattern. The warp filaments extend at an acute angle with respect to the crossing filaments and in parallel with one another and may extend in parallel with the machine direction. The warp filaments, and possibly the weft filaments as well, are thermally bondable composite filaments. Additional layers, such as additional warp and/or weft layers, a drawstring or other closing mechanism, a structure such as a label, and/or one or more laminating or reinforcing sheets may be provided on one or both surfaces of the fabric. In a variant of this configuration, both layers of the warp filaments could be omitted such that the fabric is formed from the crossing weft filaments.

The bag first and second opposed sides, each of which is formed at least in part from a strip of a sheet material and at least in part from an open mesh material. The sheet material may be, for example, a film material made at least in part from thermoplastic film and extending lengthwise from at least one end the bag. An end seam extends across one end of the bag and joins the first and second strips of sheet material together with at least one layer of the open mesh material therebetween. The end seam is formed from a seal having a strength of at least 2.5 N.

In accordance with another aspect of the invention, a form fill and seal bag is provided having upper and lower ends, with at least the lower end being closed. A body extends between the upper and lower ends to define an interior volume that contains items. The body of the filled bag is at least generally polygonal in transverse cross-sectional shape along at least the majority of its length. The body has at least two opposed sides formed from an open mesh material having a mass per unit area of no more than 30 g/m². The bag has an initial height measured from the lower end to the upper end after the lower end is sealed and after the body is formed but prior to the items being placed into the bag and prior to sealing the upper end. The bag further has a final height that is measured after the items are placed into the bag and after the bag is placed on a horizontal surface and left unsupported from above. The final height of the bag is at least 35% of the initial height.

In accordance with yet another aspect of the invention, a method is provided of forming an end seam on a bag such as a form fill and seal bag. The method comprises pressing opposed sides of the bag together under heat and pressure at a temperature of less than 149° C. and a dwell time of less than 0.5 seconds and producing a seam having a seam strength of at least 2.5 N. The bag includes at least two layers of a sheet material and at least one layer of an open mesh material disposed between the layers of sheet material. The seam may be formed from a fin seal.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 6 is a detail view showing a portion of the fabric illustrated in FIG. 4;

FIG. 7 is a sectional view of the material, taken generally along the lines VII-VII in FIG. 6.

FIG. 8 is a perspective view of a first bag made at least in part from an open mesh material;

FIG. 17 is a front elevation view of the bag of FIG. 16;

FIG. 18 is a right side elevation view of the bag of FIG. 16;

FIG. 19 is a sectional view of the bag taken generally along the lines 19-19 in FIG. 17;

FIG. 20 is a sectional view of the bag taken generally along the lines 20-20 in FIG. 17;

FIG. 21 is a sectional view of the bag taken generally along the lines 21-21 in FIG. 18;

FIG. 27 is a side elevation view showing the bag of FIGS. 16-21 sitting on a surface adjacent two filled prior art bags;

FIG. 28 is a perspective view of a multi-substrate bag constructed in accordance with another embodiment of the present invention;

FIG. 29 is a front elevation view of the bag of FIG. 28;

FIG. 30 is a rear elevation view of the bag of FIG. 28;

FIG. 31 is a side sectional view taken generally along the lines 31-31 in FIG. 28;

FIG. 31A is a side sectional view of an alternative construction of the bag of FIGS. 28-31;

FIG. 31B is a side elevation view of another alternative construction of the bag of FIGS. 28-31;

FIG. 31C is a side elevation view of another alternative construction of the bag of FIGS. 28-31;

FIG. 32 is a top plan view taken generally along the lines 32-32 in FIG. 29;

DETAILED DESCRIPTION OF THE PREFERRED EMBODIMENTS

Figure 1:
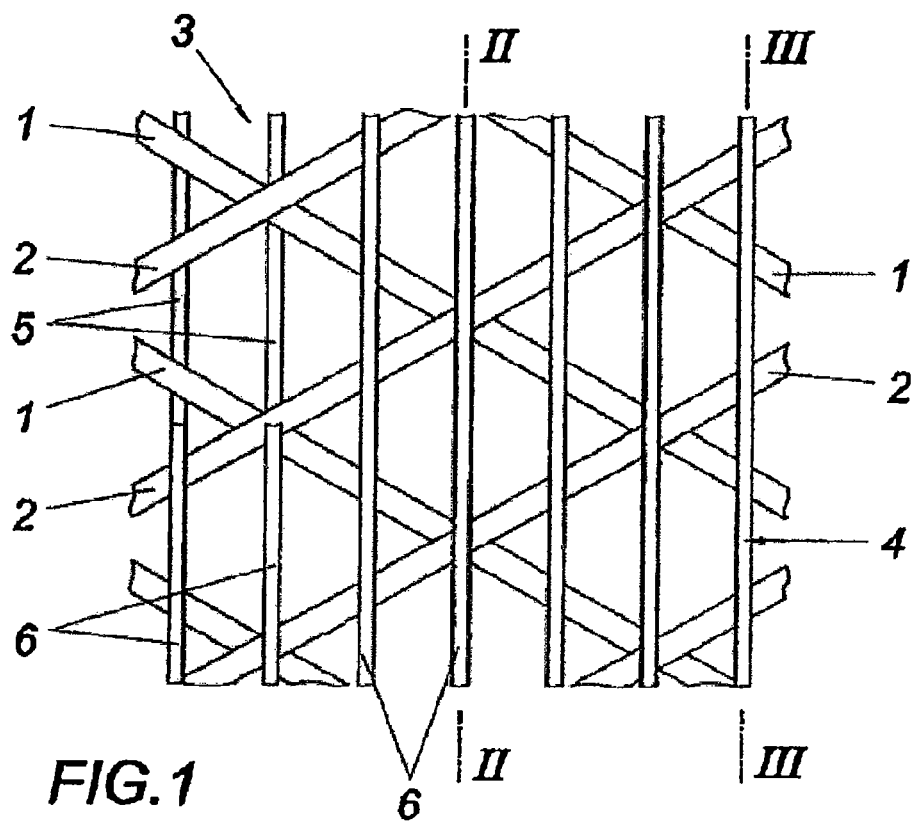
FIG. 1 is a plan view of a section of an open mesh material constructed in accordance with a first preferred embodiment of the invention.

Several non-limiting embodiments of an open-mesh material will now be described, followed by a description of applications of such a material in the form of various styles of bags.

1. Open Mesh Material

As indicated above, an open mesh material constructed in accordance with the present disclosure includes filaments that intersect each other and that are thermally bonded at at least some of their points of intersection to form a lightweight, strong, dimensionally stable, open mesh material. Possible materials include, but are not limited to, woven fabrics in which the filaments intersect by being interlaced over and under one another, knit fabrics in which the filaments intersect by being inter-looped one around the other, and non-woven fabrics in which the filaments intersect by being layered one on top the other in a crossing fashion. "Intersect" as used herein means that that the intersecting filaments are non-parallel with one another and contact one another at one or more locations. At least some the filaments could contact and even be bonded to other filaments without intersecting the other filaments. However, filaments may also contact other filaments without intersecting and/or without bonding. For example, some of the filaments could intersect other filaments while being collinear with and lying on top of still other filaments, as is the case with the "stacked" warp filaments described below in conjunction with FIGS. 1-3. In that embodiment, the warp filaments of the upper layer intersect with the weft filaments while being collinear with and lying on top of the underlying warp filaments of the lower layer. In addition, at least some of the filaments could intersect one another without being thermally bonded to one another at their points of intersection, as is the case with the weft filaments described below in conjunction with FIGS. 1-3.

The term "filament" as used herein should be understood to mean a strand of material and should be considered synonymous with "tape", "ribbon", "yarn", or "thread". In order to provide a frame of reference, the terms "warp filaments" and "weft filaments" will be used to describe the crossing filaments. Typically, but not necessarily, the warp filaments will extend at least generally in the "machine direction." It should be understood that those terms are used merely as a frame of reference and not to require that the material be made in any particular manner or have any desired orientation unless otherwise specified. Other directional terms such as "above" and "below" also are used as a frame of reference and should not be construed as limiting.

Some or all of the filaments are "composite filaments." The term "composite filament", as used herein, refers to a filament formed from a composite material having a high melting point "carrier" portion and a relatively low melting point "bonding" portion. The carrier portion also is preferably, but not necessarily, of a higher density than the bonding portion. It forms the structural component of the filament. These composite filaments may be formed from a variety of materials such as a monolayer material formed from a blend of low melting point and high melting point materials. They may also be formed from laminated layers of material or co-extruded layers of material. Composite filaments formed from co-extruded materials may be formed, for example, from a so-called core and sheath material in which a relatively high melting point core is surrounded by at least one layer of a relatively low melting point sheath. A single core may be provided within each sheath. Alternatively, multiple cores may be encapsulated in each sheath. The encapsulated cores may be spaced apart from one another or may contact one another, either by lying side-by-side or by being braided or otherwise intertwined. Alternatively, co-extruded materials could be formed from a relatively high melting point layer having a low melting point layer disposed on one or both sides of it. The term "melting point" as used herein should mean the temperature at which the material can initiate bonding with another material.

The composite filaments could be formed by (i) blending materials in a monolayer or a monofilament, (ii) laminating materials, or (iii) co-extruding materials. Many permutations of low melting point and high melting point materials could be used to form these composite filaments. Possible combinations of materials include a high density polyethylene (HDPE) or a medium density polyethylene (MDPE) as a carrier portion, and a low density polyethylene (LDPE) or linear low density polyethylene (LLDPE) as a bonding portion. These materials may be employed alone or blended or otherwise combined with other materials. Other possible combinations of materials include the use of heat sealable polypropylene as one or more of the carrier portion and the bonding portions. In addition, other materials may be used for all or part of one or both portions (e.g., biodegradable materials such as cellulose materials or starch materials). The material of the bonding portion(s) have a lower melting point or initiate bonding at a lower temperature than the material of the carrier portion(s). The resultant composite filaments can be heated to a temperature at which the bonding portion(s) bond sufficiently to adjacent filaments without appreciably affecting the dimensional and structural integrity of the carrier portion(s).

Figures 2, 3:
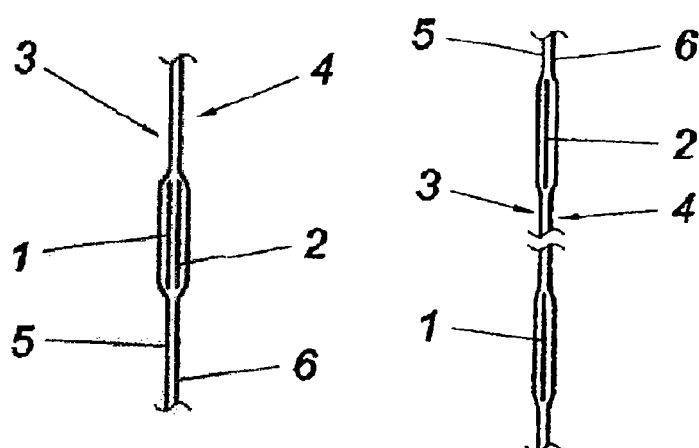
FIG. 2 is a sectional elevation view taken generally along the lines II-II in FIG. 1.
FIG. 3 is a side elevation view taken generally along the lines in FIG. 1.

Turning now to FIGS. 1-3, a first embodiment of an open mesh material formed from intersecting filaments of the type described above is illustrated. The material of this embodiment is a non-woven fabric formed from two mutually crossing groups of elongated weft filaments 1, 2 flanked by lower and upper warp layers 3 and 4, respectively. The warp layers 3 and 4 are formed from respective warp filaments 5 and 6, respectively. The weft filaments 1 and 2 cross one another at an acute angle to form a generally diamond shaped pattern. The warp filaments 5 and 6 extend at an acute angle with respect to the crossing filaments and in parallel with one another. They extend in the machine direction in the illustrated embodiment, but could extend in other directions as well.

In the subject embodiment, the weft filaments 1, 2 of the fabric are not composite filaments. As such, the weft filaments 1, 2 are capable of bonding to one another only to a relatively small extent, if at all. The weft filaments 1, 2 are fixed in their mutual position with the help of lower and upper cover layers or warp layers 3, 4, each of which is formed from a plurality of spaced, parallel, elongated warp filaments 5 and 6, respectively. As is shown in FIG. 1, the filaments 5 of the lower warp layer 3 and the filaments 6 of the upper warp layer 4 are disposed in line with each other, so that the weft filaments 1, 2 are fixed between the mutually connected layer strips 5, 6 without having to join the weft filaments 1, 2 with each other in the region of their crossing points. The layers are thermally bonded and pressed together after or during the laying-down process to fuse the layers together at their points of intersection, hence forming the fabric.

As mentioned above, the open mesh material of this embodiment is a non-woven fabric formed from mutually crossed small filaments each laid in their own planes rather than taking the form of a knit or woven fabric where filaments are inter-looped or interlaced. As a result, simple constructional conditions are obtained with the advantage that, in the crossing regions of the warp filaments and the weft filaments, no inter-looped or interlaced junctions occur which impair the structural integrity of the fabric. In inter-looped or interlaced intersections, the filaments cross each other so that the filaments change planes. This change in planes of the filaments at the inter-looped or interlaced junctions creates stress points in the knit or woven fabrics. In the open mesh fabric of this embodiment, stress points are avoided because the warp and weft filaments merely lie flat on each other and can be provided with a very small thickness of between 10 and 35 µm for example, thus maximizing the fabric's full tensile strength. The fixing of the mutual position of the weft filaments between the warp filaments ensures a heat-seal connection of the two warp layers to each other and of the warp layers to the interposed weft layers. The weft and warp filaments thus are tightly bound in a non-displaceable manner. The thermal treatment of the fabric also ensures that the open mesh fabric is subjected to only very low residual shrinkage and/or extensions.

To ensure that the filaments of the warp 3, 4 can positionally fix the weft filaments 1, 2 in place at their points of intersection via thermal bonding, the filaments of the warp layers 3, 4 are composite filaments as discussed above. The composite filaments may be formed from any combination of materials described above so long as at least one portion is formed of a higher melting point material than the other portions. In the illustrated embodiment, the filaments 5 and 6 of the warp layers 3 and 4 are composite filaments formed from a co-extruded film material having a carrier layer of a relatively high tensile strength and a high melting point and a bonding layer of a relatively low melting point on at least the side of the carrier layer facing the weft filaments 1, 2. The carrier layer and bonding layer of the composite filaments of the warp layers 3 and 4 of this embodiment comprise a HDPE or a MDPE and a LDPE or a LLDPE, respectively. The weft filaments 1 and 2 of this embodiment are made of a relatively high strength material having a melting point above that of the bonding layer of the warp layer filaments. HDPE is currently preferred, but other materials may be utilized, such as heat sealable polypropylene. The high density material of the weft filaments may, but not necessarily, be coated with a lower-melting point material such as LLDPE to enhance bonding at the points of intersection with the warp layer filaments.

The desired dimensions of the individual filaments may vary significantly depending on several factors, including the composition of the filaments and the intended use of the open mesh material. The warp and weft filaments may, for example, have a thickness of 40-200 microns and more typically 60-150 microns. The weft filaments of the illustrated embodiment are considerably wider than the warp filaments, but filaments of the same or about the same widths could be used in all layers, if desired. In addition, the weft filaments could be narrower than the warp filaments.

While the desired characteristics of the open mesh material in terms of mass per unit area, strength-to-mass ratio, percent elongation, etc., may vary depending on the intended end use of the material, the material of the present disclosure has a low mass per unit area and a high strength-to-mass ratio while maintaining good dimensional stability. This low mass per unit area and high strength-to-mass ratio of the material reduces the carbon footprint associated with manufacturing, transporting, and disposing of products made from the material, such as produce bags, because the products require fewer raw materials and take up less volume. They therefore require less energy for their production and handling than products made from traditional materials.

One example is the family or "consumer" bag applications used to store items such as nuts, oranges, potatoes, onions, seafood (such as shrimp, mussels, or clams), newspapers, flower bulbs, dried beans, and wrapped candy. These and other bags are used to store the items and to display them at the point of sale. The open mesh material used to form at least part of these bags preferably has a mass per unit area of less than 30 $g/m^2$, more preferably less than or equal to about 25 $g/m^2$, and even more preferably in the range of about 15 $g/m^2$ to about 20 $g/m^2$. Its strength-to-mass ratio in at least one of the machine and cross machine directions preferably is greater than or equal to about 2.67 $N/(g/m^2)$ more preferably greater than or equal to about 3.50 $N/(g/m^2)$, and even more preferably greater than or equal to about 4.45 $N/(g/m^2)$, where strength is measured in accordance with ASTM D 5034. As a measurement of dimensional stability, the material preferably has a percent elongation in at least one of the machine direction and the cross machine direction of less than or equal to about 50%, more preferably less than or equal to about 40%, and even more preferably less than or equal to about 30%, where elongation is measured in accordance with ASTM D 5034.

An open mesh material, hereafter "material 1", that has been successfully tested in this regard is a non-woven fabric formed from i) composite warp filaments each made from a 50 micron thick center layer of HDPE coextruded on both of its upper and lower sides with a 15 micron thick layer of LLDPE, and ii) weft filaments made from 100% HDPE. Using the ASTM D 5034 testing method to determine breaking strength and breaking elongation, the fabric was clamped between opposed jaws and stretched to its breaking point while measuring fabric elongation and the applied force. The fabric was considered to "break" when it was pulled apart and subjected to an applied force that peaked and then dropped by at least 20%. The applied peak force was then recorded as the "breaking force." The test was repeated in both the machine and cross machine directions for a statistically significant number of fabric samples. The tests revealed that the fabric had a mass per unit area of 20 $g/m^2$, a strength of 92.6 N, and a strength-to-weight ratio of 4.63 $N/(g/m^2)$ in the machine direction. The "material 1" fabric also had a strength of 41.8 N and a strength-to-mass ratio of 2.09 $N/(g/m^2)$ in the cross machine direction. It had a percent elongation of about 42% in the machine direction and about 33% in the cross machine direction.

After the filaments of the layered structure of the non-woven fabric of this embodiment are thermally bonded together, the resulting open mesh fabric is dimensionally stable, offers very low residual shrinkage and extension, and can be thermally bonded together with materials with similar melt index properties such as the same or similar fabrics, films, etc. The density of the fabric on a per area basis is determined by several factors, including the density and width of the individual filaments of each layer, the spacing between the parallel warp filaments 5 and 6 of each layer 3 and 4, and the pitch or the inclination of the weft filaments 1 and 2. The openness of the mesh increases with increasing weft filament pitch and/or increasing warp and/or weft filament spacing. As the openness of the mesh increases, the density of the mesh decreases. For filaments of a given composition and of given dimensions, the dimensional stability and strength of the fabric in the machine direction are at least generally proportional to the spacing between the warp filaments and is at least generally proportional to the inclination or pitch of the weft filaments relative to the machine direction. The dimensional stability and strength of the fabric in the cross machine direction, on the other hand, is generally proportional to the strength of the bonds at the intersection of the various layers and inversely proportional the inclination or pitch of the weft filaments relative to the machine direction.

Turning now to FIGS. 4-7, a second embodiment of an open mesh material produced in accordance with the disclosure is illustrated. The material of this embodiment, like that of the first embodiment, is a non-woven fabric formed from two mutually crossing groups of weft filaments 11, 12 which are fixed in their mutual position by being thermally bonded to lower and upper cover layers or warp layers 13, 14. The weft filaments 11 and 12 cross one another at an acute angle to produce a diamond shaped pattern. Each warp layer 13 or 14 is formed from a plurality of spaced, parallel filaments 15 or 16 extending in the machine direction. The filaments 15 and 16 of the warp layers are composite filaments as discussed above in conjunction with the first embodiment.

The fabric of this embodiment differs from the fabric of the first embodiment in that the weft filaments 11 and 12 are also composite filaments. All composite filaments 11, 12, 15, and 16 of the illustrated embodiment are made from the same composite material, but it is to be understood that the filaments 11 and 12 of the weft layers could be made from a different composite material than the filaments 15, 16 of one or both of the warp layers 13, 14. The illustrated composite filaments are formed from a layered co-extruded material, but could be formed, for example, from blended material, a laminated material, or a braided or intertwined material.

Figure 5:
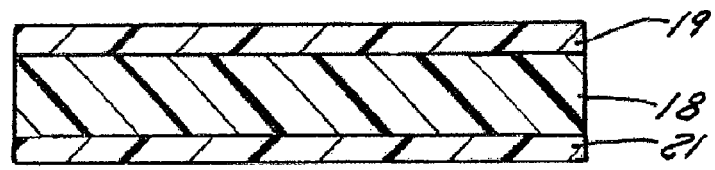
FIG. 5 is a sectional end view of a filament used in the fabric of FIG. 4.

Each of the illustrated composite filaments 11, 12, 15, 16 of this embodiment comprises a tri-layer co-extruded material schematically illustrated in FIG. 5. That material has a center, relatively high melting point carrier layer 18 that is flanked by upper and lower bonding layers 19 and 21 of a relatively low melting point material. The layers 18, 19, and 21 may be formed from any combination of materials described above so long as the carrier portion is formed of a higher melting point material than the bonding portion(s).

The composite weft filaments 11, 12 of this embodiment are positively bonded to both the warp filaments 15, 16 and to each other at their points of intersection. As a result of this configuration, the filaments of all fabric layers are bound to each other at all points of intersection by the melting and re-hardening of bonding layer material as schematically illustrated in FIG. 7. Since the fabric strength in the cross machine direction is dependent primarily on the aggregate strength of the bonds, the positive weft filament to weft filament bond results in a higher material strength in the cross machine direction than is present in a material in which the weft filaments are not made from a composite material (assuming that all other characteristics of the fabric, including filament thickness, filament density, filament composition, etc., are the same).

One material, hereafter "material 2", that has been successfully tested in this regard has both warp and weft composite filaments formed from a 50 micron thick center layer of HDPE coextruded on both of its upper and lower sides with a 15 micron layer thick layer of LLDPE. Material 2 had a mass per unit area of 20 g/m$^2$. It had a strength of 89.8 N and a strength-to-mass ratio of 4.49 N/(g/m$^2$) in the machine direction. Material 2 also had a strength of 59.6 N and a strength-to-mass ratio 2.98 N/(g/m$^2$) in the cross machine direction. It had a percent elongation of about 40% in the machine direction and about 27% in the cross machine direction.

The fabric illustrated in FIGS. 4-7 also differ from the fabric illustrated in FIGS. 1-3 in that the lower warp layer filaments 15 are offset from the upper warp layer filaments 16. This arrangement provides more points of intersection in a given area of the fabric for bonding, albeit with less material being available for bonding at any given point of intersection. Of course, the lower warp filaments 15 also could be aligned with the upper warp filaments 16 as discussed above in connection with the first embodiment.

Figure 4:
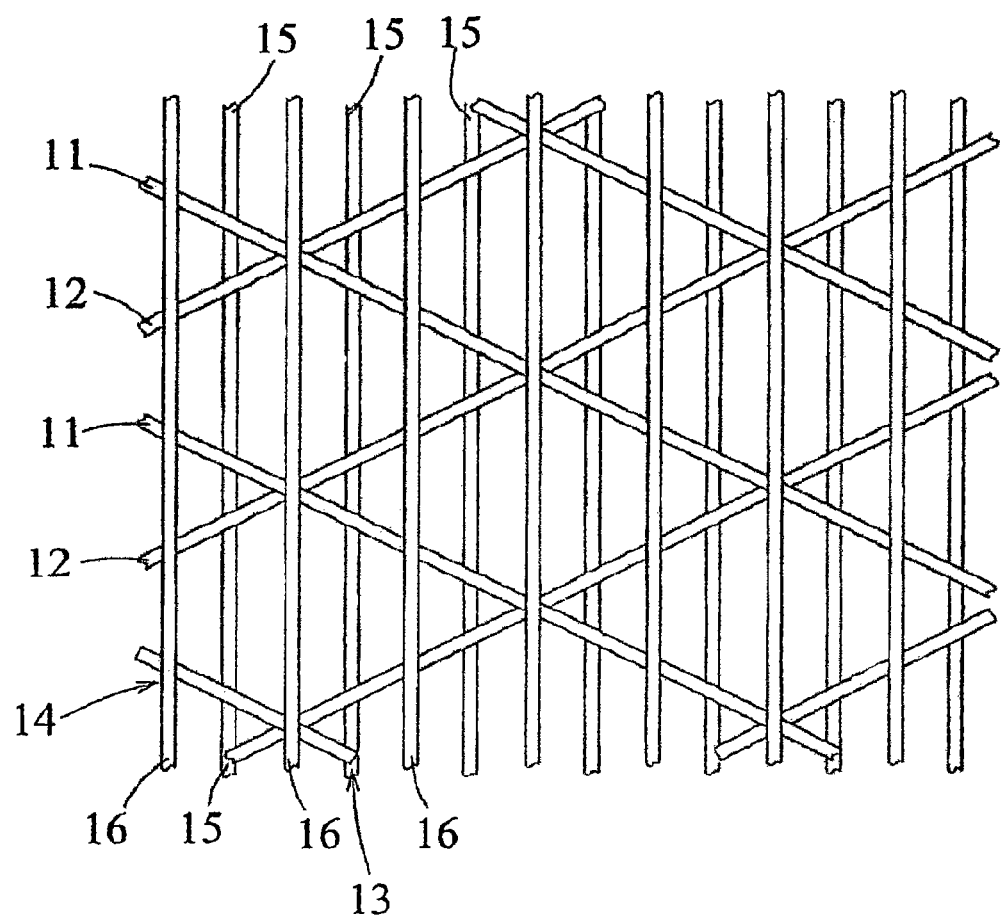
FIG. 4 is a top plan view of an open mesh material constructed in accordance with a second preferred embodiment of the invention.
Figure 4A:
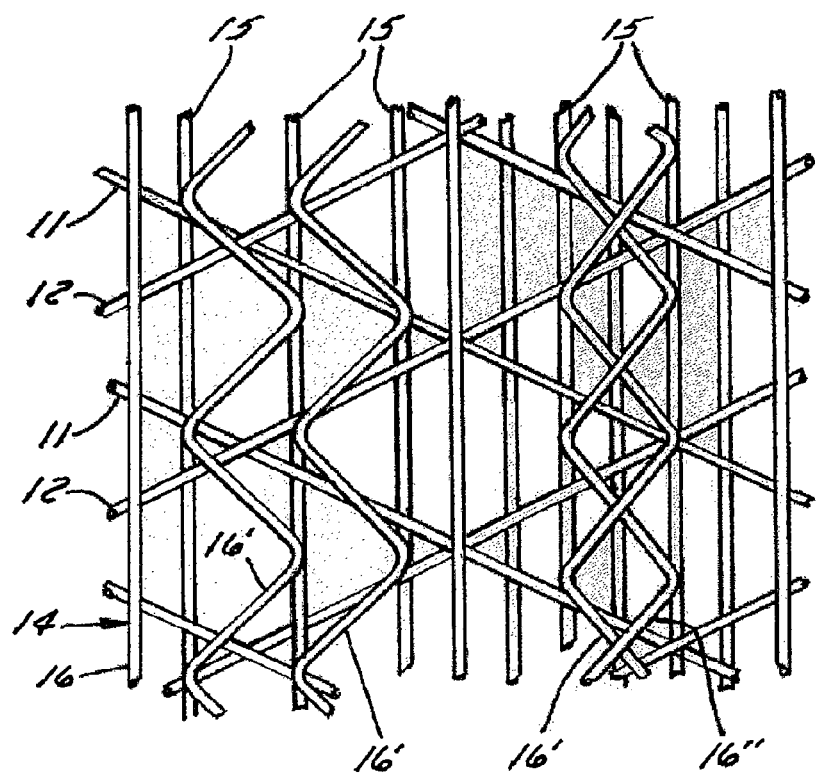
FIG. 4A is a top plan view of an open mesh material forming a variant of the material illustrated in FIG. 4.

At least some of the warp filaments in one and possibly both layers 13 and 14 could extend non-linearly rather than linearly. An example of this alternative is illustrated in FIG. 4A, in which some of the filaments 16' in the upper warp layer 13 are disposed in a generally sinusoidal waveform. Other repeating or non-repeating waveforms are possible as well. For instance, one of the filaments 16" is shown as a sinusoidal waveform that is offset by 180 degrees relative to that of an adjacent non-linear filament 16'. These and other variants could be provided in the same or different fabrics.

Many changes and modifications could be made to the open mesh materials disclosed herein without departing from the spirit of the present disclosure. For instance, as mentioned briefly above, one or both of the warp layers of either the non-woven fabric of FIGS. 1-3 or the non-woven fabric of FIGS. 4-7 could be omitted, producing a two or three layer fabric. In addition, one or more auxiliary materials or layers may be provided outside and/or inside of one or both of the warp layers or even in the weft layer. For instance a structure such as a label, one or more laminating or reinforcing sheets, or one or more additional warp layers could be provided on a surface of one or both of the warp layers. A closing device such as a drawstring could also be provided in the weft layers. In addition, while the discussion as focused largely on non-woven fabrics, the disclosure also applies to woven or knit fabrics in which at least some of the filaments intersect one another are thermally bonded to one another at at least some of their points of intersection. Open mesh materials falling within the scope of this disclosure will hereafter be referred to as "ultra-mesh materials" as a short designation for those materials.

Open Mesh Material Characteristics

Figure 34:
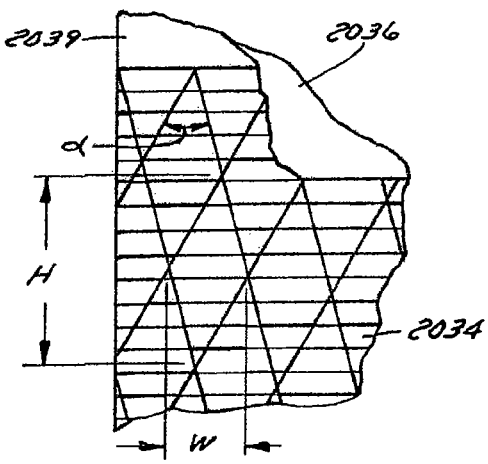
FIG. 34 is front fragmentary elevation view of a portion of FIG. 29.
Figure 37:
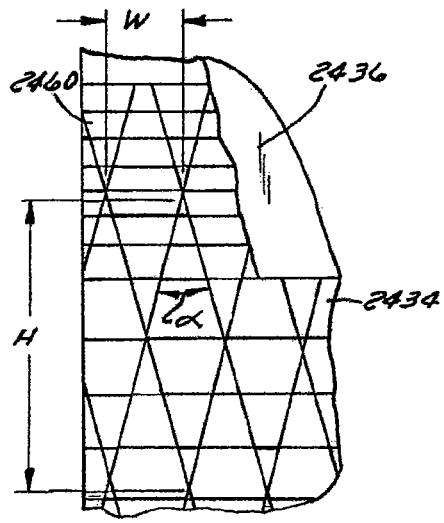
FIG. 37 is front elevation fragmentary view of a portion of FIG. 36.
Figure 39:
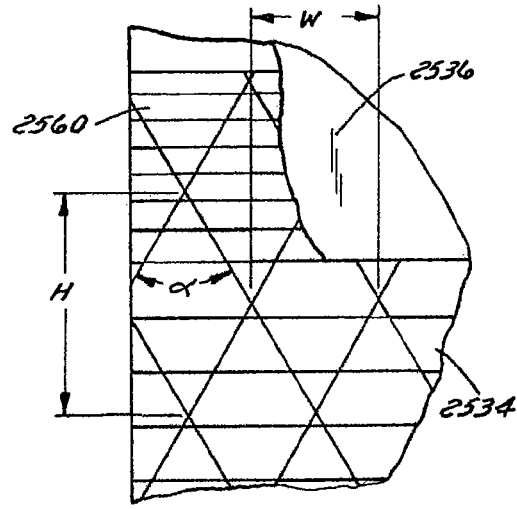
FIG. 39 is front elevation fragmentary view of a portion of FIG. 38.

Specific examples of open mesh materials of the type disclosed above were tested. Four samples were tested, grouped as follows:

Sample 1: An ultra-mesh material formed from a non-woven fabric of the type generally illustrated in FIGS. 4 and 5-7 above. The fabric consisted of two warp layers of a co-extruded filament flanking two weft layers of high-density polyethylene (HDPE). The weft filaments extended at included angles α of about 30° relative to the cross machine direction (α is shown in FIGS. 34, 37, and 39 below). Each individual filament thus extended at an angle of 15° relative to the cross machine direction. Each weft filament was formed from an 80 micron thick tri-layer ribbon having a 50 micron thick layer of HDPE interposed between two 15-micron thick layers of a linear low-density polyethylene LLDPE. The ribbon was stretched at a ratio of 6:1 to form the filaments that were incorporated into the fabric, after which the composite filament had a thickness of about 0.03 mm and a width of about 1.2 mm. The warp filaments of each layer were spaced 8 mm apart. The fabric was an alternating fabric in which the warp filaments of the lower layer were spaced about mid-way between the warp filaments of the upper layer, leading to a warp filament spacing within the fabric of about 4 mm Each weft layer filament had a thickness of about 0.04 mm and a width of about 1.5 mm.

Sample 2: An ultra-mesh material that is the same as Sample 1 except for the fact that the weft filaments had an included angle of about 36° relative to the cross machine direction.

Sample 3: An ultra-mesh material that is the same as Sample 1 except for the fact that the weft filaments had an included angle of about 40° relative to the cross machine direction.

Sample 4: An ultra-mesh material that is the same as Sample 1 except for the fact that the weft filaments had an included angle of about 46° relative to the cross machine direction.

The results of the testing are summarized in Table 1 below:

TABLE 1

OPEN MESH MATERIAL CHARACTERISTICS

| Characteristic | Sample # | | | |
|---|---|---|---|---|
| | 1 | 2 | 3 | 4 |
| Mass (g/m$^2$) | 20 | 19 | 18 | 17 |
| Breaking Strength (Machine Direction - N) (ASTM D 5034) | 85 | 83 | 63 | 68 |
| Strength-to-Mass Ratio (Machine Direction - N/(g/m$^2$)) | 4.25 | 4.37 | 3.50 | 4.00 |
| Breaking Strength (Cross Machine Direction - N) (ASTM D 5034, Grab Method) | 87 | 41 | 69 | 52 |
| Strength-to-Mass Ratio (Cross Machine Direction - N/(g/m$^2$)) | 4.35 | 2.15 | 3.83 | 3.06 |
| Burst Strength (kPa) (ASTM D 3786) | 200 | 172 | 131 | 96 |
| Breaking Elongation (Machine Direction - %) (ASTM D 5034) | 51.0 | 51.8 | 57.1 | 57.1 |
| Breaking Elongation (Cross Machine Direction - %) (ASTM D 5034) | 28.6 | 17.5 | 31.7 | 32.7 |
| Static Coefficient of Friction (Machine Direction - ASTM D 1894) | 0.562 | 0.366 | 0.317 | 0.478 |
| Kinetic Coefficient of Friction (Machine Direction - ASTM D 1894) | 0.689 | 0.647 | 0.860 | 0.555 |
| Static Coefficient of Friction (Cross Machine Direction - ASTM D 1894) | 1.300 | 1.130 | 1.390 | 1.220 |
| Kinetic Coefficient of Friction (Cross Machine Direction - ASTM D 1894) | 1.150 | 1.200 | 1.160 | 1.030 |

Coefficient of friction tests were performed in accordance with ASTM standard ASTM D 1894. Coefficients of friction were measured by sliding a sled, having its bottom surface coated with sponge rubber, over a flat surface bearing the material to be tested.

An ultra-mesh material was also tested for "stackability." "Stackability" as used herein refers to the number of strips of material that are contained in a stack of a given height when that stack is subjected to a given force. The stack could be either linear, with separate strips being stacked on top of one another as would typically be the case when items are stored in a box or other container. Alternatively, the stack could be tubular, as would be typically the case when a material is rolled about itself to form a roll. It could also be linear but formed from a continuous sheet folded in a so-called Z-fold pattern. Stackability is an important characteristic for many materials because, among other reasons, the materials or products made at least in part from them must be shipped and stored. Everything else being equal, it is desirable to contain more materials or products in a stack of a given depth so as to increase the number of materials or products that can be shipped and stored in a given volume, hence reducing storage space and further reducing the materials' or products' carbon footprint in terms of their shipping costs.

For this test, 250 strips of an ultra-mesh material were laid in a stack, and the initial height of that stack was measured. The ultra-mesh material was of a type that is well suited for use in bags and that was subjected to many of the tests referenced herein. It will be referred to herein as the "ultra-mesh A" material for the sake of conciseness. The ultra-mesh A material is a non-woven fabric of the type generally illustrated in FIGS. 1-3. The fabric has a density of 20 g/m$^2$ and consisted of two warp layers of a co-extruded filament flanking two weft layers of high-density polyethylene (HDPE). The warp filaments extend in parallel with the machine direction. The weft filaments extend at an included angle of about 36° relative to the cross machine direction. Each weft filament is formed from an 80 micron thick tri-layer ribbon having a 50 micron thick layer of HDPE interposed between two 15-micron thick layers of a linear low-density polyethylene LLDPE. The ribbon was stretched at a ratio of 6:1 to form the filaments that were incorporated into the fabric, after which the composite filament had a thickness of about 0.03 mm and a width of about 1.2 mm. The warp filaments of each layer are spaced 8 mm apart. Each weft layer filament has a thickness of about 0.02 mm and a width of about 1.5 mm.

A force of 27.1 N was then applied to each stack uniformly along the length of the stack, and the height was again measured. The 27.1 N force was designed to emulate the compressive force typically imposed on stacks of items when boxed. A total force of 42.3 N was then applied uniformly along the length of each stack, and the height was again measured. The results of these tests are summarized in Table 2 below:

TABLE 2

ULTRA-MESH STACKABILITY TEST RESULTS

| Pre-Compressed Height (cm) | Number of Strips/cm | Compressed Height @ 27.1N (cm) | Number of Strips/cm | Compressed Height @ 42.3N (cm) | Number of Strips/cm |
|---|---|---|---|---|---|
| 3.59 | 61.3 | 1.43 | 174.8 | 1.27 | 196.9 |

Another significant feature of materials formed by intersecting filaments or other intersecting structures is the strength imparted to the material by the bonds at the points of intersection. "Bond strength tests" were performed to measure the tensile or tear strength of the ultra-mesh A material at the points of intersection and to compare the observed strength to the strengths between the bonded cross laminated layers of a slit and stretched film forming a fabric that is marketed commercially under the trade name "CLAF®". CLAF® is a registered trademark of ENOS ANCI, Inc. Three materials were tested, namely:

MS-grade CLAF®,
S-grade CLAF®, and
Ultra-mesh A as described above.

In each test, a 5.1 cm wide by 20.3 cm long rectangular strip of the material to be tested was prepared with the cross machine portion of the sample extending lengthwise of the sample and the machine portion running widthwise. The tested ultra-mesh A material samples thus had their warp filaments extending widthwise of the sample. Each sample to be tested was placed between two vertically spaced jaws. The upper end of the strip to be tested was attached to the upper jaw by hooking the warp structure onto six evenly spaced hooks that extended downwardly from the upper jaw and that hooked onto a horizontally extending portion of the material. In the case of the ultra-mesh A material, the hooks engaged one of the warp filaments. The lower end of the strip was clamped to the lower jaw, making sure that the material was secure in both the upper hooking system and the lower jaw while maintaining a vertical alignment of the strip with the upper and lower jaws. The jaws where then pulled apart at the rate of 30.5 cm/min while measuring the force being imposed on the sample. The "breaking force" or peak force imposed on the sample, calculated as described above in conjunction with the discussion of "material 1", was recorded as a measurement of tear strength at the points of intersection or simply "bond strength". The test was repeated for a series of 10 samples of each of the tested materials. The breaking force and standard deviation were then recorded for each material as reflected by Table 3 below:

TABLE 3

TEAR STRENGTH AT POINTS OF INTERSECTION

| Mesh Type | Average Breaking Force (N) | Breaking Force Standard Deviation (%) |
| --- | --- | --- |
| MS-Grade CLAF ® | 9.6 | 0.28 |
| S-Grade CLAF ® | 9.6 | 0.44 |
| Ultra-Mesh A | 25.1 | 1.35 |

Table 3 confirms that, on average, the ultra-mesh A material has a tensile or tear strength at the points of intersection of the warp and weft filaments, as measured by material breaking force, of over 10 N, over 15 N, and even over 20 N. The resultant tear strength is well over double that exhibited by the tested CLAF® materials, despite the fact that the ultra-mesh material A is lighter and more open than the CLAF® materials. It is believed that comparable results would be obtained with the other ultra-mesh materials described herein.

The specific ultra-mesh materials described above, including material 1, material 2, and ultra-mesh A, as well as many other fabrics and other open mesh materials falling within the scope of the present disclosure, could be converted into any of a wide variety of articles, such as bags, silt fences, bale wraps, or screens, by any of various converting operations. This conversion could be performed by forming seams through the application of heat, by folding, by sewing, through the use of adhesives, or any combination thereof. Three such applications will now be described.

2. L-Seam Bags

Open mesh materials pursuant to the present disclosure, and also referred to as "ultra-mesh materials" for the sake of conciseness, can be converted into a so-called L-seam bag by folding the material about itself to provide a vertical edge seam and sewing the fabric at its side bottom edges. The resulting bag would have an open top, one edge formed from a fold, and a second edge and a bottom formed from seams. These seams typically are formed by sewing, but could conceivably be formed by thermal bonding, by using adhesives, or by some combination of any or all of all these three and possibly other techniques. The warp layers in the fabric preferably would extend horizontally along the bag to maximize side seam strength.

Referring now to FIG. 8, an L-seam bag 20 includes a first end 22 and an oppositely disposed second end 24. The bag 20 further includes a side seam 26 that extends between the first and second ends 22, 24. The bag is formed from an open mesh material, preferably one of the non-woven fabrics described above or a fabric or other open mesh material having similar characteristics.

In the depicted orientation of FIG. 8, the first end 22 of the bag 20 is a bottom end while the second end 24 of the bag 20 is a top end. The bottom end 22 is a closed end while the top end 24 is an open end. However, the top end could be closed after being filled using any suitable technique.

In the depicted embodiment, the bag 20 is formed by folding (i.e., bending over upon itself) the material and sewing the material at its side and bottom edges so that the bag 20 includes an interior cavity 28. Bags having sewn side and bottom seams are commonly referred to as L-sewn bags.

The side seam 26 of the bag 20 of this embodiment is formed by stitching or sewing opposite sides of the material together after the material has been folded. A side 30 that is opposite the side seam 26 is a fold or bend, which is formed by bending the material over itself. The bottom end 22 includes a seam 32 that is formed by sewing a first portion of an edge of the material to an overlapping portion of the edge after the material has been folded.

In the depicted embodiment, the material of the bag 20 is a non-woven fabric oriented so that the warp filaments 15, 16 (FIGS. 1-3) are generally parallel to the seam 32 of the bottom end 22 of the bag 20. In the depicted orientation, the warp filaments 15, 16 extend horizontally along the bag 20 to maximize the strength of the side seam 26.

Figure 9:
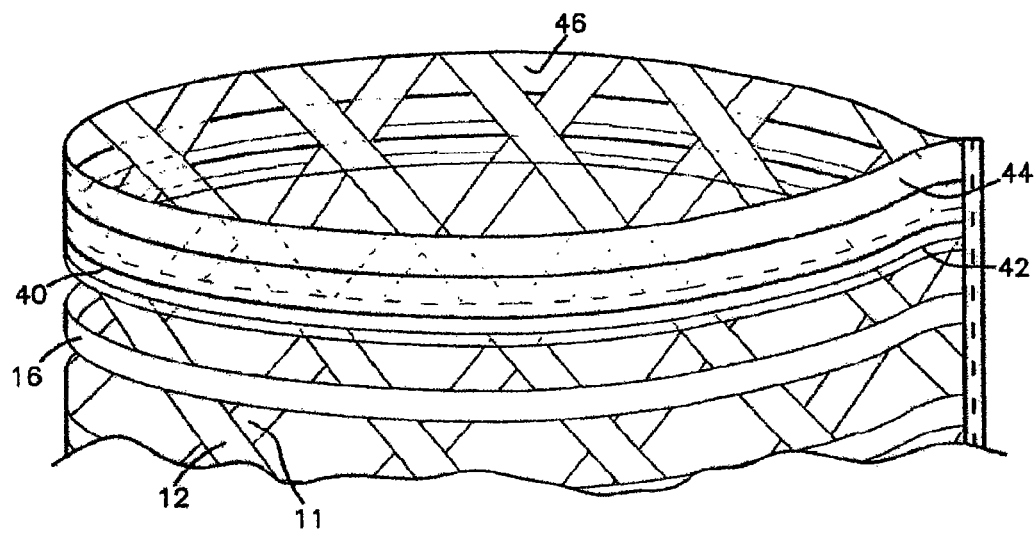
FIG. 9 is a fragmentary perspective view of a texturized portion of the bag of FIG. 8.

Referring now to FIGS. 8 and 9, the top end 24 of the bag 20 will be described. The top end 24 includes an edge 34. The edge 34 defines an opening 36 that provides access to the interior cavity 28.

The top end 24 further includes a texturized portion 38 disposed adjacent to the edge 34. The texturized portion 38 is adapted to provide a texture that is distinct from the texture of the fabric of the bag 20. This distinctive texture of the texturized portion 38 of the bag 20 allows handlers to identify the top end 24 of the bag 20 by feel or touch.

The texturized portion 38 includes a filament 40. In one embodiment, the filament 40 has an outer diameter that is in a range of about 0.1 mm to about 1 mm. In another embodiment, the outer diameter of the filament 40 is in a range of about 0.1 mm to about 0.5 mm. In another embodiment, the outer diameter of the filament 40 is in a range of about 0.2 mm to about 0.3 mm. In the depicted embodiment of FIGS. 8 and 9, the texturized portion 38 includes a plurality of filaments 40. The filament 40 is disposed on an outer surface of the fabric of the bag 20 adjacent to the edge 34 of the top end 24. In the depicted embodiment, the filament 40 is disposed on the outer surface of the fabric of the bag 20 so that the filament 40 is not intertwined or interlaced with the fabric. The filament 40 extends continuously around the top end 34 of the bag 20.

In the depicted embodiment of FIGS. 8 and 9, the filament 40 is oriented so that it is generally parallel to the warp filaments 15, 16 of the fabric of the bag 20. In another embodiment, the filament 40 is generally horizontal in the bag 20. In another embodiment, the filament 40 is generally parallel to a plane in which the opening 36 of the top end 24 is disposed.

In one embodiment, the filament 40 is a monofilament that is manufactured from a high density polyethylene (HDPE) material. In another embodiment, the filament 40 is a coextruded filament having a carrier portion and a bonding portion. The carrier portion can be manufactured from materials including a high density polyethylene (HDPE) or a medium density polyethylene (MDPE) while the bonding portion can be manufactured from materials including a low density polyethylene (LDPE) or linear low density polyethylene (LLDPE).

In one embodiment, the texturized portion 38 includes a band 42 that extends around the top end 24 of the bag 20 at a location that is adjacent to the edge 34 of the top end 24. The band 42 is a narrow strip of material. The band 42 can be manufactured from a thermoplastic material including polypropylene, low density polyethylene, coated polyester, etc. In one embodiment, the material of the band 42 has a thickness of about 25 microns. In one embodiment, the thermoplastic material of the band 42 is transparent or translucent. In another embodiment, the thermoplastic material of the band 42 is opaque.

The band 42 defines a width W. In one embodiment, the width of the band 42 is less than or equal to about 50.8 mm. In another embodiment, the width W of the band 42 is less than or equal to about 38.1 mm. In another embodiment, the width W is less than or equal to about 25.4 mm.

In another embodiment, the band 42 is used without the filament 40. In this embodiment, the inner surface 46 of the band 42 bonds to warp layers 14 and weft filaments 11, 12.

The band 42 includes an outer surface 44 and an oppositely disposed inner surface 46. In the depicted embodiment of FIGS. 8 and 9, the inner surface 46 bonds to warp layers 14, the weft filaments 11, 12, and the filament 40. In one embodiment, the inner surface 46 of the band 42 includes a bonding portion that is adapted to adhere to the warp layers 14, the weft filaments 11, 12 and the filament 40 through the application of heat and pressure.

Figure 10:
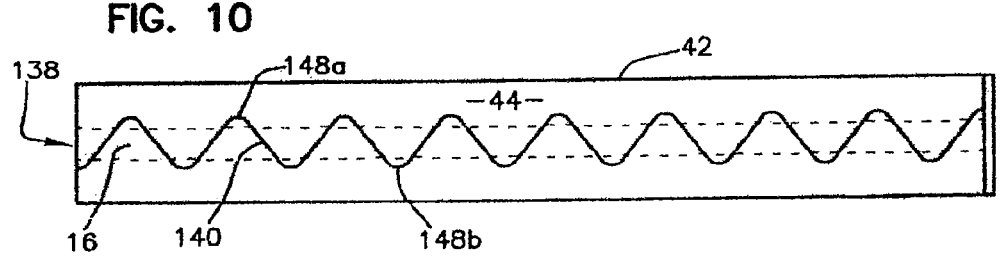
FIG. 10 is a front view of an alternate embodiment of a texturized portion suitable for use with the bag of FIG. 8.

Referring now to FIG. 10, an alternate embodiment of a texturized portion 138 of the bag 20 is shown. The texturized portion 138 includes the band 42 and a filament 140, which is disposed adjacent to the edge 34 of the top end 24 of the bag 20. In the subject embodiment, the filament 140 is disposed on an outer surface of one of the warp filaments 16 of the warp layer 14 so that a portion of the filament 140 is disposed between the warp filament 16 and the band 42.

The filament 140 is disposed in a non-linear waveform (e.g., square, triangle, saw-tooth, sine, etc.) pattern. The waveform pattern of the filament 140 is a generally oscillating pattern. The oscillating pattern of the filament 140 defines a plurality of peaks 148a and a plurality of valleys 148b. In the depicted embodiment, the oscillating pattern is a generally sinusoidal.

Figure 11:
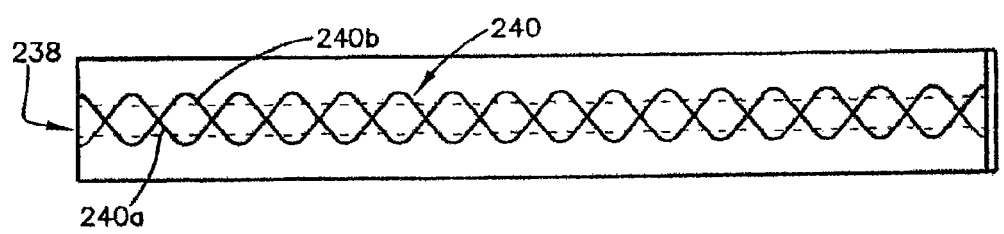
FIG. 11 is a front view of an alternate embodiment of a texturized portion suitable for use with the bag of FIG. 8.

Referring now to FIG. 11, an alternate embodiment of a texturized portion 238 of the bag 20 is shown. The texturized portion 238 of the bag 20 includes a plurality of filaments 240. The plurality of filaments includes a first filament 240a and a second filament 240b. The first filament 240a is disposed in a first non-linear waveform pattern while the second filament 240b is disposed in a second non-linear waveform pattern. In the depicted embodiment, the first and second waveform patterns are generally sinusoidal. The second waveform pattern is offset from the first waveform pattern. For example, in the depicted embodiment, the first and second waveform patterns are 180° out of phase.

Referring again to FIG. 8, the bag 20 includes a label 50. The label 50 extends around at least portion of the bag 20. In the depicted embodiment, the label 50 is disposed between the bottom and top ends 22, 24 of the bag 20.

The label 50 includes an outer surface 52 and an oppositely disposed inner surface. The outer surface 52 is adapted to include indicia (e.g., colors, numbers, letters, symbols, etc.) regarding information (e.g., manufacturer, weight, ingredients, dates, nutritional information, etc.) about the contents disposed in the interior cavity 28 of the bag 20.

The inner surface of the label 50 may be an adhesive-free surface. It will be understood that the term "adhesive-free" means that the inner surface does not include an applied adhesive or an adhesive coating. The inner surface of the label 50 is affixed to the composite filaments of the fabric of the bag 20 through the application of heat and pressure. In one embodiment, the inner surface of the label 50 is affixed to the warp layers 14 of the bag 20. In another embodiment, the inner surface of the label 50 is affixed to the warp and weft layers of the bag 20.

Figure 12:
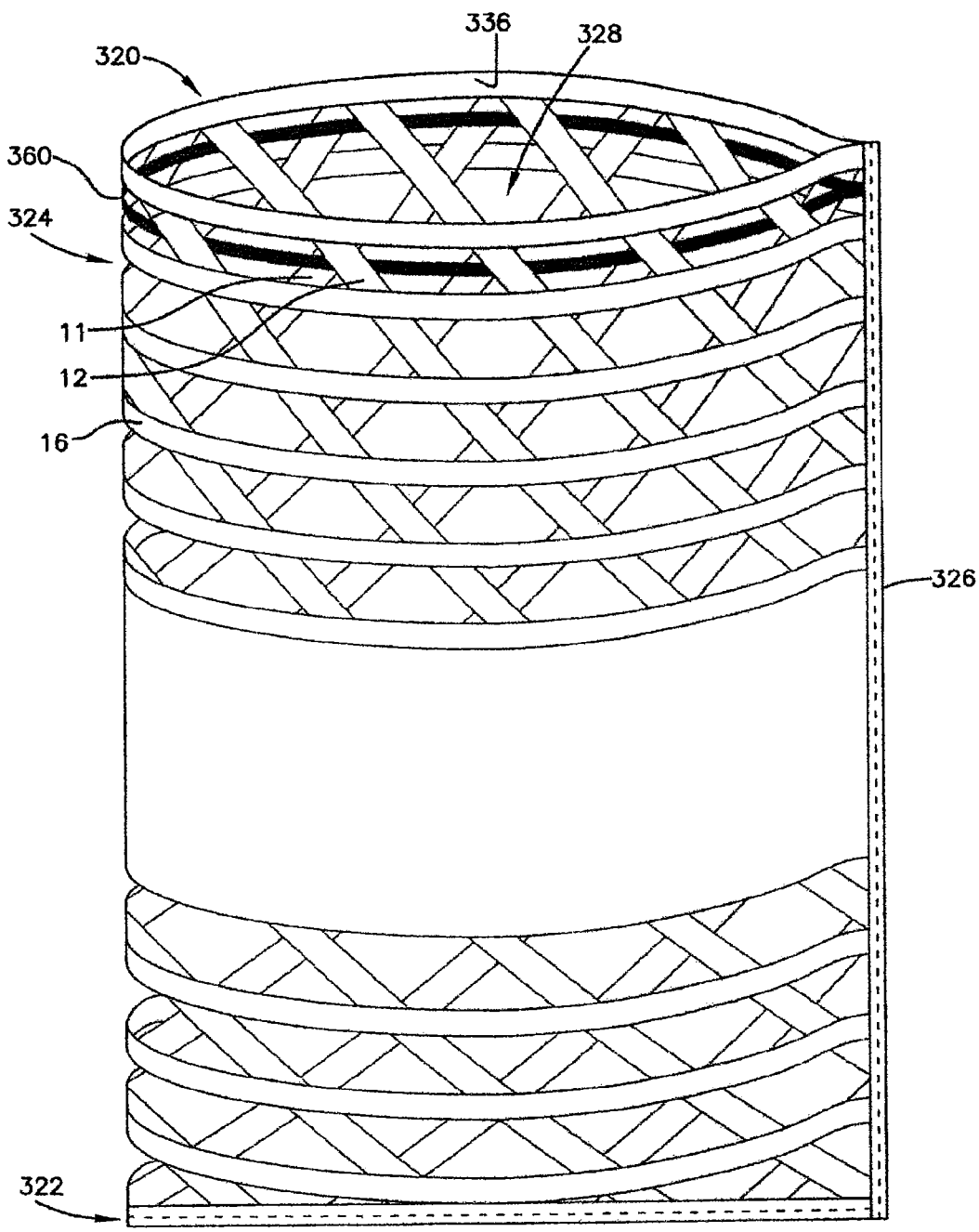
FIG. 12 is a perspective view of an alternate embodiment of a bag.

Referring now to FIG. 12, an alternate embodiment of a bag 320, which is constructed from an open mesh material of the present disclosure, is shown. The bag 320 includes a bottom end 322, an oppositely disposed top end 324 and a side seam 326 that extends between the bottom and top ends 322, 324.

The bottom end 322 is a closed end while the top end 324 is open. The top end 324 defines an opening 336 that provides access to an interior cavity 328 of the bag 320.

The bag 320 of this embodiment further includes a closure member 360. The closure member 360 is adapted to selectively close the opening 336 to prevent or block access to the interior cavity 328 of the bag 320. In one embodiment, the closure member 360 is a warp knitted fabric. In another embodiment, the closure member 360 is a non-woven fabric. The closure member 360 can be manufactured from a thermoplastic material such as polyethylene, polypropylene, high density polyethylene, nylon, polyesters, etc.

The closure member 360 is disposed at the top end 324 of the bag 320. The closure member 360 is freely disposed between the weft filaments 11, 12 so that the weft filaments 11, 12 can slide along the closure member 360. In the depicted embodiment, the closure member 360 is disposed between the weft filaments 11, 12 so that the closure member 360 is generally parallel to the warp filaments 16 of the bag 320. While the closure member 360 is captured between the weft filaments 11, 12, the closure member 360 is secured to the bag 320 at the side seam 326.

To close the opening 336 of the top end 324, the closure member 360 is pulled in a direction that is generally outward from the top end 324. As the closure member 360 is pulled, the weft filaments 11, 12 slide along the closure member 360 toward other weft filaments 11, 12 of the fabric of the bag 320 and bunch together. As the weft filaments 11, 12 slide along the closure member 360, the size of the opening 336 is reduced. When the weft filaments 11, 12 are bunched together, the closure member 360 can be tied to secure the top end 324 in a closed position (i.e., when the opening 336 is closed).

Figure 13:
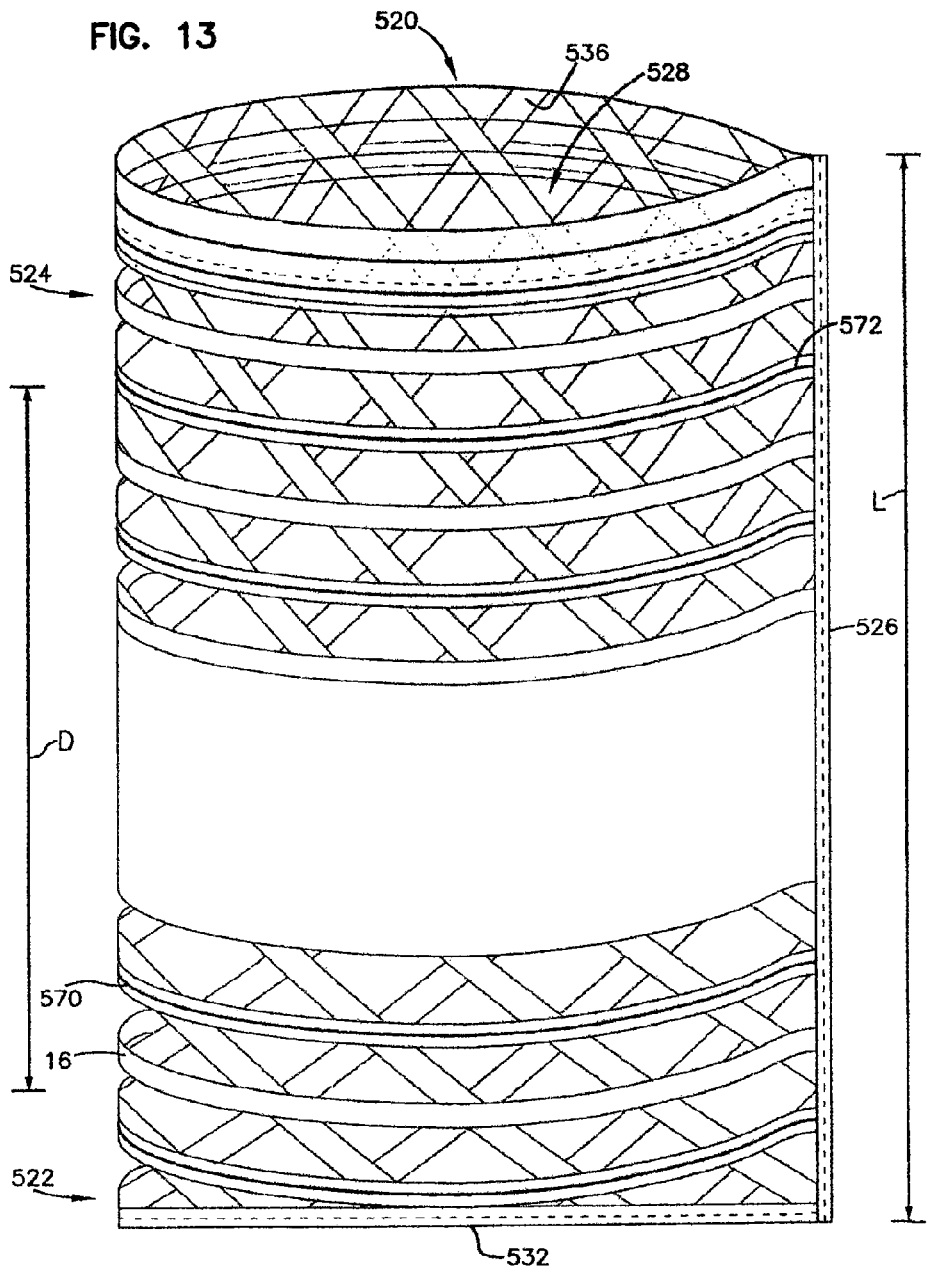
FIG. 13 is a perspective view of an alternate embodiment of a bag.

Referring now to FIG. 13, an alternate embodiment of a bag 520, which is constructed from the fabric of the present disclosure, is shown. The bag 520 includes a bottom end 522, an oppositely disposed top end 524 and a side seam 526 that extends between the bottom and top ends 522, 524.

The bottom end 522 is a closed end while the top end 524 is an open end. The bottom end 522 includes a seam 532 that is formed by sewing a first portion of an edge of the fabric to an overlapping portion of the edge after the fabric has been folded. The top end 524 defines an opening 536 that provides access to an interior cavity 528 of the bag 520.

The bag 520 includes a plurality of strands 570. The plurality of strands 570 is adapted to increase the hoop strength of the bag 520 without significantly increasing the weight of the bag 520.

The plurality of strands 570 is disposed in the bag 520 so that the strands 570 are generally parallel to the warp filaments 16 of the fabric. In one embodiment, the strands 570 are disposed adjacent to the warp filaments 16. In another embodiment, the strands 570 are disposed between adjacent warp filaments 16. In another embodiment, the strands 570 are disposed on the warp filaments 16. In one embodiment, each of the strands 570 has an end portion 572 that is secured at the side seam 526 of the bag 520.

The strands 570 have a tensile strength that is greater than or equal to the tensile strength of the warp filaments 16. The strands 570 can be manufactured from various materials. In one embodiment, each of the strands 570 is a non-woven or thermoplastic material such as a polyester material. In another embodiment, each of the strands 570 can be made from the thread used to secure the side seam 526 and the seam 532 at the bottom end 522.

The strands 570 are disposed at intervals along an axial distance D of the bag 520. In one embodiment, the intervals between the strands 570 are fixed (i.e., the intervals between the strands 570 are equal). In another embodiment, the intervals between the strands 570 vary so that the intervals between strands are unequal.

In one embodiment, the axial distance D at which the strands 570 are disposed is equal to a length L (i.e., from the bottom end 522 to the top end 524) of the bag 520. In another embodiment, the strands 570 can be can be localized along the length L depending on the particular application for the bag 520 so that the axial distance D is less than the length L of the bag 520. In one embodiment, the strands 570 are disposed in the lower half of the bag 520 so that the axial distance D is less than or equal to 0.5 L as measured from the bottom end 522 of the bag 520. In another embodiment, the strands 570 are disposed in a lower third of the bag 520 so that the axial distance D is less than or equal to 0.33 L as measured from the bottom end 522 of the bag 520. In another embodiment, the strands 570 are disposed in the lower quarter of the bag 520 so that the axial distance D is less than or equal to 0.25 L as measured from the bottom end 522 of the bag 520.

Figure 14:
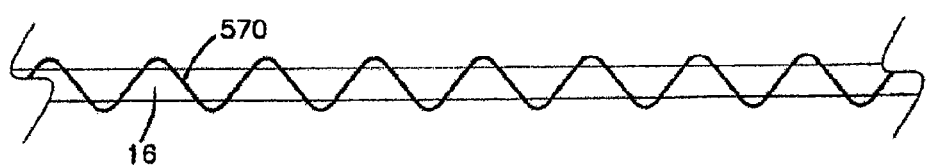
FIG. 14 is a front view of an alternate embodiment of a strand suitable for use with the bag of FIG. 13.
Figure 15:
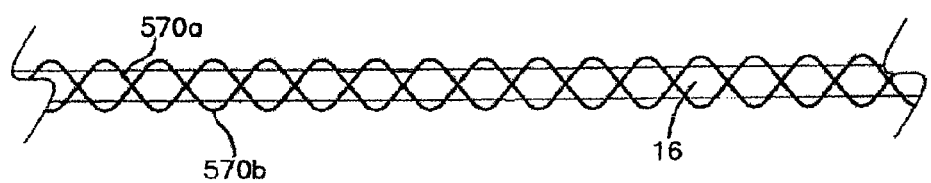
FIG. 15 is a front view of an alternate embodiment of a plurality of strands suitable for use with the bag of FIG. 13.

Referring now to FIGS. 14 and 15, an alternate embodiment of the strands 570 for the bag 520 is shown. In this alternate embodiment, the strand 570 is disposed on the warp filament 16 so that the strand 570 forms a waveform pattern (e.g., square, triangular, saw-tooth, sinusoid, etc.). In the depicted embodiment of FIG. 14, the waveform pattern has a generally sinusoidal shape.

In the depicted embodiment of FIG. 15, a plurality of strands 570 is disposed on each warp filament 16. The plurality of strands 570 includes a first strand 570a and a second strand 570b. The first strand 570a is disposed in a first waveform pattern while the second strand 570b is disposed in a second waveform pattern. In the depicted embodiment, the first and second waveform patterns are generally sinusoidal. The second waveform pattern is offset from the first waveform pattern. For example, in the depicted embodiment, the first and second waveform patterns are 180° out of phase.

Being formed from an ultra-mesh material, the L-seam bag constructed in accordance with the present disclosure, referred to herein as a "new style" L-seam bag for the sake of conciseness, exhibits superior stackability when compared to prior art L-sewn bags. Traditionally, L-sewn bags have been shipped and stored in "bales" in which several thousand bags are compressed and bound together using twine and/or shrink wrap. Each bale typically contains four or five stacks of bags of equal numbers arranged next to each other. The bound bales are then stacked on a pallet and compressed to a final height, typically about 50 in (127 cm), and the entire pallet is shrink-wrapped. Several pallets are then placed on a truck for shipping.

The stackability of new style L-seam bags, made from the above-described ultra-mesh A material, was tested against traditional raschel knit L-sewn bags using this baling and palleting process. Two sizes of each style of bag were tested: a 10 lb bag and a 5 lb bag. It should be noted at this time that bag sizes are often referred to in the packaging industry as a function of their intended volumetric or weight-based capacity. Hence, a 10 lb bag is one that is designed to have a working capacity of 10 lbs (4.5 kg), a 5 lb bag is one that is intended to have a working capacity of 5 lbs (2.7 kg), etc.

The bags were baled using a force of 60,000 lbs (267 kN) and stacked on pallets using the technique described above. The test results the testing are summarized in Table 4 below:

TABLE 4

STACKABILITY OF L-SEAM BAGS

| | Raschel 10 lb | Ultra-Mesh 10 lb | Raschel 5 lb | Ultra-Mesh 5 lb |
|---|---|---|---|---|
| Bag Size | 10 lb | 10 lb | 5 lb | 5 lb |
| Number of Bags/Stack | 750 | 1,000 | 600 | 1,000 |
| Number of Bags/Bale | 3,000 | 4,000 | 3,000 | 5,000 |
| Bale Dimension (cm) | 52.1 × 116.8 × 35.6 | 52.1 × 116.8 × 22.9 | 58.4 × 114.3 × 33.7 | 53.3 × 116.8 × 25.4 |
| Bale Height (cm) | 35.6 | 22.9 | 33.7 | 25.4 |
| Bags/cm | 21.1 | 43.7 | 17.8 | 39.4 |
| Number of Rows/Stack | 4 | 6 | 5 | 6 |
| Number of Bales/Pallet | 8 | 12 | 10 | 12 |
| Number of Bags/Pallet | 24,000 | 48,000 | 30,000 | 60,000 |

The improvements are significant.

As can be seen from Table 4 above, 3,000 10 lb raschel knit L-seam bags were compressed to a height of 14 in (35.6 cm) during the baling process, resulting in the formation of a stack of 43.7 bags/cm when the stacked bags were subjected to a 267 kN force. Hence, each bale contained 3,000 bags. Comparatively, 4,000 new style 10 lb ultra-mesh L-seam bags were compressed to a height of 9 in (22.3 cm) during the baling process, resulting in the formation of a stack of 21.1 bags/cm when the stacked bags were subjected to 267 kN force. These tests thus confirm that subjecting stacks of L-seam bags constructed in accordance with the present disclosure to a force of 267 kN forms a stack having more than 25 bags/cm, more than 30 bags/cm, and even more than 35 bags/cm.

Due to the reduced height of the bale of the new style mesh bags compared to a bale of raschel knit L-sewn bags, it was possible to store more bales on a pallet. For shipping and storage purposes, the maximum desired height of a pallet and the items stored on it is typically considered to be about 50 in (127 cm). Bales of 10 lb raschel knit L-sewn bags are typically stacked on a pallet in four layers, each containing two bales. Due to the reduced bale height of the new style 10 lb L-seam bags made from the ultra-mesh A material, an additional two rows of bales can be stacked on a pallet to essentially the same final height. The same pallet thus can hold 12 bales of new style 10 lb L-seam bags as opposed to only 8 bales of traditional raschel knit 10 lb L-sewn bags. As a result, 48,000 new style 10 lb bags can be stored on a pallet, compared to only 24,000 prior art raschel knit 10 lb L-sewn bags. Fifty percent more bags can be shipped and stored in a given volume. The shipping and storage space requirements are dramatically reduced, further reducing the bags' carbon footprint. Table 4 confirms that similar improvements are obtained for ultra-mesh 5 lb L-sewn bags.

3. Form, Fill, and Seal Bags

Ultra-mesh materials as described herein, or other materials having at least some of the characteristics of the ultra-mesh materials, can also be used to make multi-substrate bags having both sheet and open mesh portions with at least one thermally-bonded seam. While embodiments of form, fill, and seal (FFS) bags will now be described that take the form of four-panel vertical form, fill and seal (VFFS) bags, at least many of the concepts discussed herein are also applicable to other vertical form, fill and seal bags, horizontal form, fill and seal (HFFS) bags, and any other multi-substrate FFS bags having at least one thermally-bonded end seam sealing mesh and film portions of the bag together.

Figure 16:
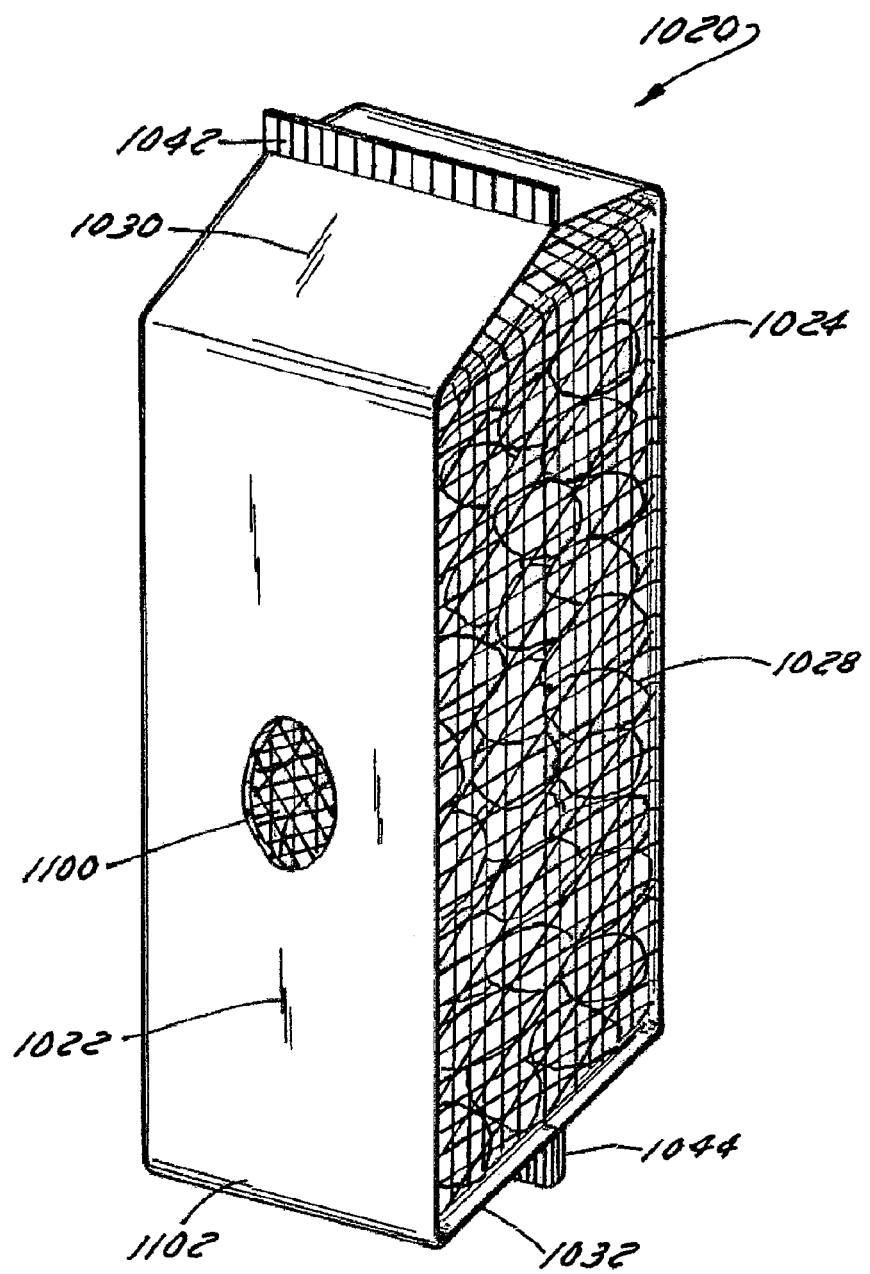
FIG. 16 is a perspective view of a multi-substrate form, fill and seal bag made in part from an open mesh material.

Turning first to FIGS. 16-21 and to FIGS. 16-18 in particular, a first embodiment of a FFS bag 1,020 comprises a so-called four-panel VFFS bag having front 1,022, rear 1,024, left 1,026, and right 1,028 sides and upper 1,030 and lower 1,032 ends. The bag is filled with items such as produce items or other food products. The term "filled" as used herein does not mean that the entire interior volume of the bag must be occupied by items. Indeed, in commercial applications, a bag typically is "filled" to its rated weight of stored items while the items occupy less than 70%, and quite often less than 50%, of the interior volume of the bag. Items that may be stored in these bags may, for example, be nuts, oranges, potatoes, onions, seafood (such as shrimp, mussels, or clams), newspapers, flower bulbs, dried beans, or wrapped candy.

The bag 1,020 is generally square along the majority of its length when filled with materials, except where it is collapsed at the upper and lower ends 1,030 and 1,032 where the opposed front and rear sides 1,022 and 1,024 are sealed to one another with the ends of the left and right sides 1,026 and 1,028 sandwiched therebetween. It could also be rectangular or have another polygonal cross sectional shape and exhibit many, if not all, of the characteristics discussed herein. The left and right sides 1,026 and 1,028 are formed from a gusseted open mesh material 1,100. At least one end of each of the outer surfaces of the front and rear sides 1,022 and 1,024 is formed at least in part from a sheet material 1,102 extending lengthwise of the bag from a sealed end of the bag. Both ends of one or both of the front and rear sides may be made from the sheet material. In the illustrated embodiment, sheet material extends the entire length of the front and rear sides. In the bag 1,020 of the illustrated embodiment, the rear side 1,024 is formed entirely from the sheet material 1,102, and the front side 1,022 of the bag 1,020 is formed from the open mesh material 1,100 overlaid with the sheet material 1,102.

Referring to FIGS. 20 and 21, the sheet material 1,102 of the front side 1,022 of the bag 1,020 preferably extends the entire width of the front side 1,022, but may extend less than the entire width if desired. It is heat sealed to underlying mesh fabric 1,100 at its edges via seams 1,034, 1,036 that are approximately ¼ in (0.64 cm) to ⅜ in (0.95 cm) wide. The rear side 1,024 of the bag 1,020 has two vertically extending seams 1,038, 1,040 at the corners thereof where the film material 1,102 overlaps the edges of the open mesh fabric 1,100. Both of the seams 1,038, 1,040 comprise overlap seams. At least the lower end 1,032 is closed, possibly by sewing or clasping but more preferably by thermal bonding. In the illustrated embodiment, both the upper and lower ends 1,030 and 1,032 of the bag 1,020 are closed by thermally bonded seams. These seams may take the form of fin or peel seams 1,042, 1,044 formed by pressing two seal bars together, also as discussed below. They alternatively could be formed by other seams such as overlap seams. The upper and lower seams 1,042, 1,044 typically have a length L of about ⅜ in (0.95 cm) to ½ in (1.27 cm). The illustrated bag 1,020 has a storage capacity of one to three lbs and is about 4 in (10.2 cm) wide by 10 in (25.4 cm) high. However, the concepts discussed herein are equally applicable to larger or smaller bags of different proportions.

The sheet material 1,102 may be any sheet material capable of being heat bonded to itself and to other materials. It preferably is capable of receiving indicia on its outer layer. A material made in whole or in part from a synthetic resin film material could suffice. One such material is a so-called PET laminate having a thin layer of a relatively high melting point polyester material, serving as a print surface, laminated onto a relatively thick layer of a relatively low melting point linear low density polyethylene (LLDPE) material. The LLDPE material melts during the heat bonding process to seal the film material to adjacent materials. One preferred material is approximately 3 mil (0.076 mm) thick. However, as discussed in more detail below, other materials of different thicknesses have been successfully tested. Other sheet materials also could be used.

The open mesh material 1,100 is of an ultra-mesh type and, thus, is formed from a number of intersecting filaments, at least some of which are composite filaments formed from a composite material having a high melting point "carrier" portion and a relatively low melting point "bonding" portion. It may take the form of one of the non-woven fabrics described generally above in conjunction with FIGS. 1-7.

Figure 22:
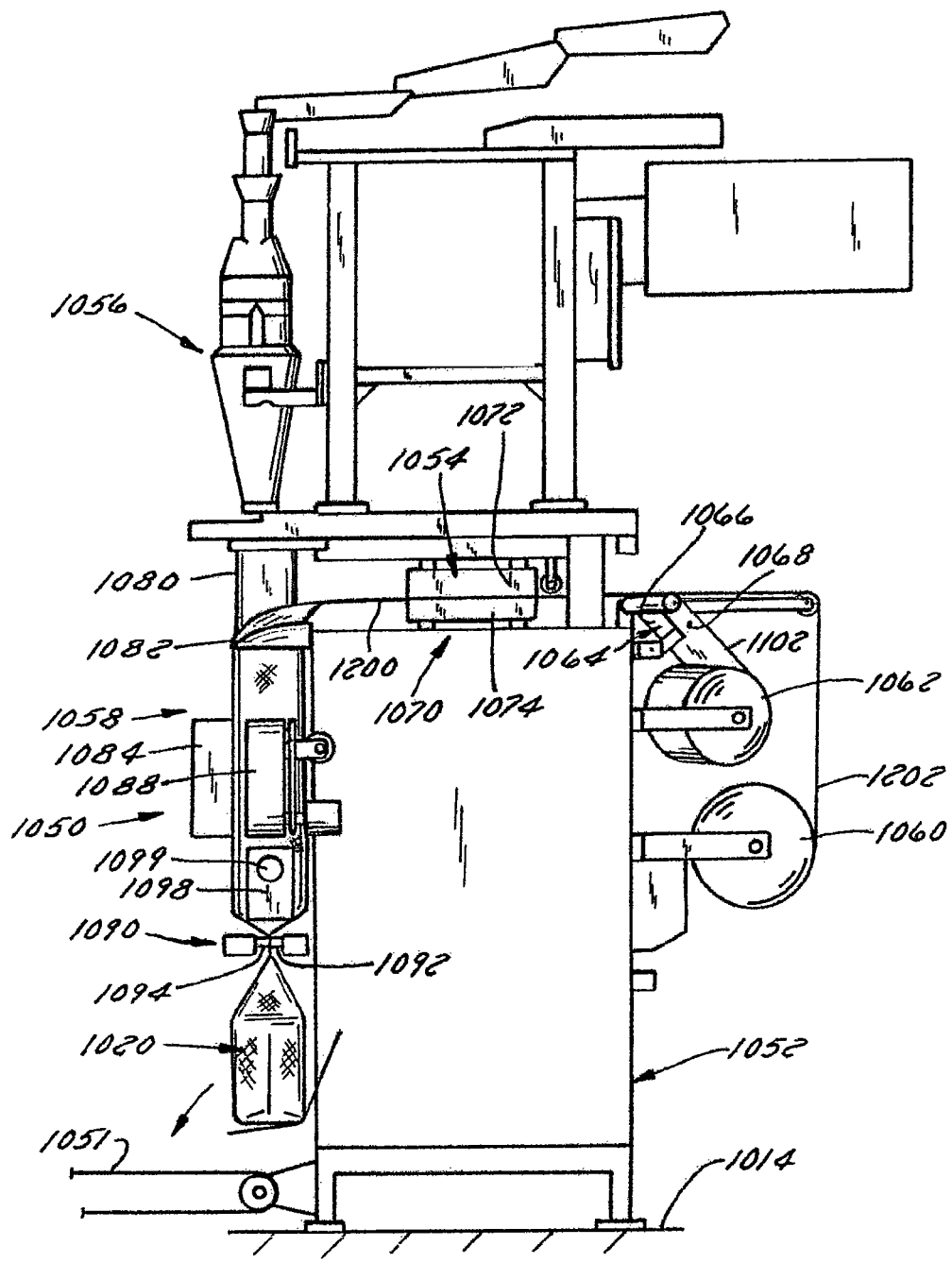
FIG. 22 is a somewhat schematic side elevation view of a vertical form, fill and seal machine that can be used to make the bags of FIGS. 16-21.
Figure 23:
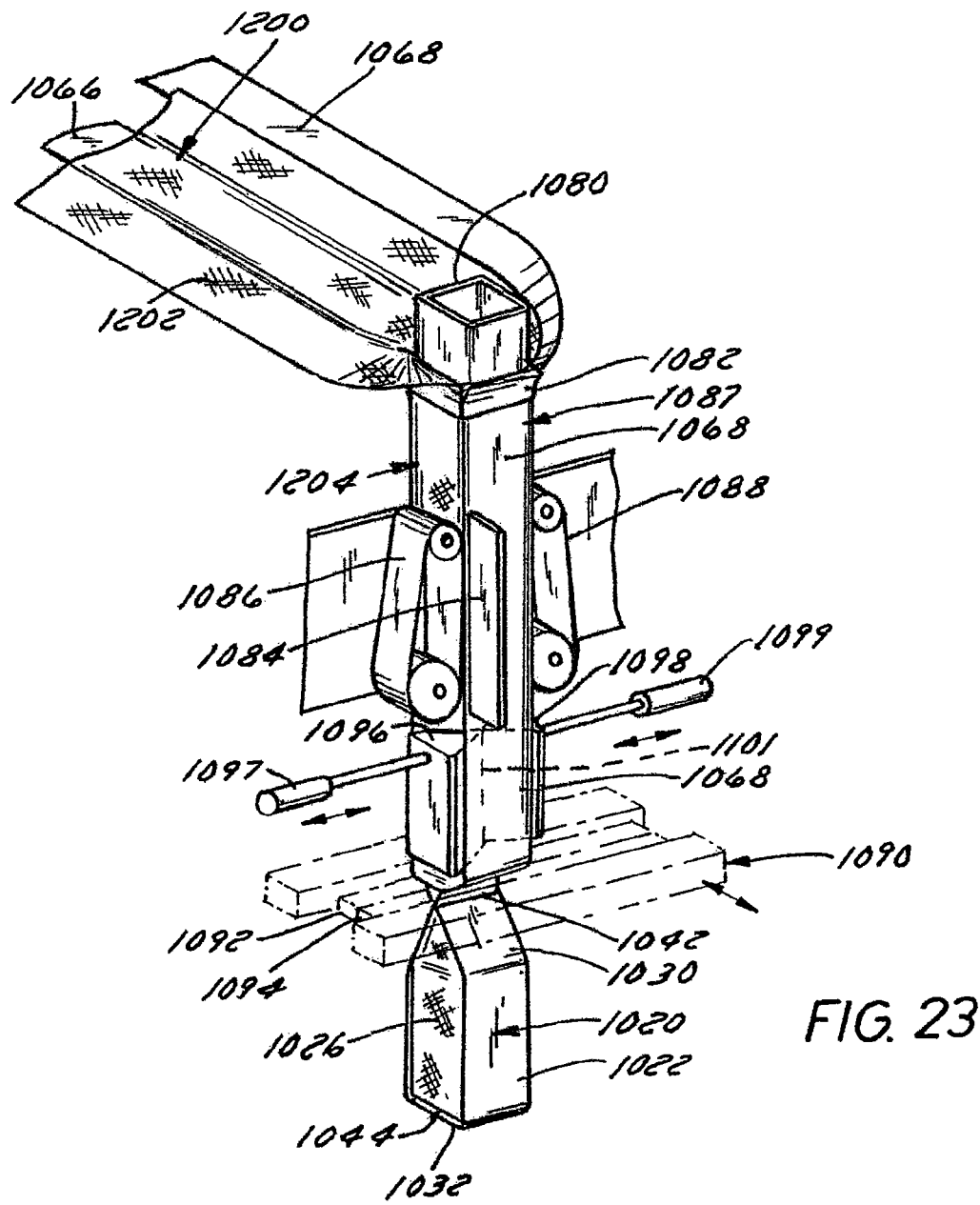
FIG. 23 is a perspective view showing a portion of the vertical form, fill and seal machine of FIG. 22 in greater detail.

Turning now to FIGS. 22 and 23, the bags 1,020 may be manufactured on a vertical form, fill and seal machine 1,050 that forms product-filled bags from rolls 1,060 and 1,062 of the open mesh fabric 1,100 and the sheet material 1,102, respectively. The machine 1,050 includes a frame 1,052, a substrate forming station 1,054, a product dispenser 1,056, and a form, fill, and seal assembly 1,058. The substrate forming station 1,054 forms a continuous strip of a composite substrate 1,200 from rolls 1,060, 1,062 of mesh and film. The form, fill, and seal assembly 1,058 receives batches of product from the product dispenser 1,056 and simultaneously forms bags 1,020 from the substrate 1,200, fills those bags 1,020 with the product, and seals the ends of the formed and filled bags 1,020.

The substrate forming station 1,054 includes first and second takeoff rolls 1,060 and 1,062 for the open mesh fabric 1,100 and the film 1,102, respectively. The open mesh fabric 1,100 preferably is wound onto the roll in a continuous strip 1,202 with the warp filaments extending lengthwise of the strip or in the machine direction. The warp filaments may ultimately extend vertically in the finished bags. The second takeoff roll 1,062 supports a roll of the PET laminated film material, printed with two adjacent repeating patterns of print indicia positioned side-by-side in alignment with each other. A slitter 1,064 is provided downstream of the takeoff roll 1,062 and is operable to slit the film 1,102 into two indicia-bearing strips or print bands 1,066, 1,068. A system of guide rollers and guide bars guides the print bands 1,066, 1,068 and the continuous strip 1,202 of the open mesh fabric 1,100 into a substrate forming assembly 1,070, where the edge of the first print band 1,068 is thermally bonded to an edge of the mesh strip 1,202, and the other print band 1,066 is thermally bonded to the outer surface of the mesh strip 1,202 in a spaced apart relationship to the first print band 1,068. Segments of these print bands 1,066, 1,068 ultimately form the rear and the front of the finished bags, respectively. The thermal bonding preferably is performed via a system of heated bars 1,072 and a platen 1,074 as is generally known in the art. A suitable system for slitting indicia-bearing film into two print bands and for heat bonding the print bands to a substrate is known, for example, from International Publication No. WO 99/58323 to Winiecke.

Figure 24:
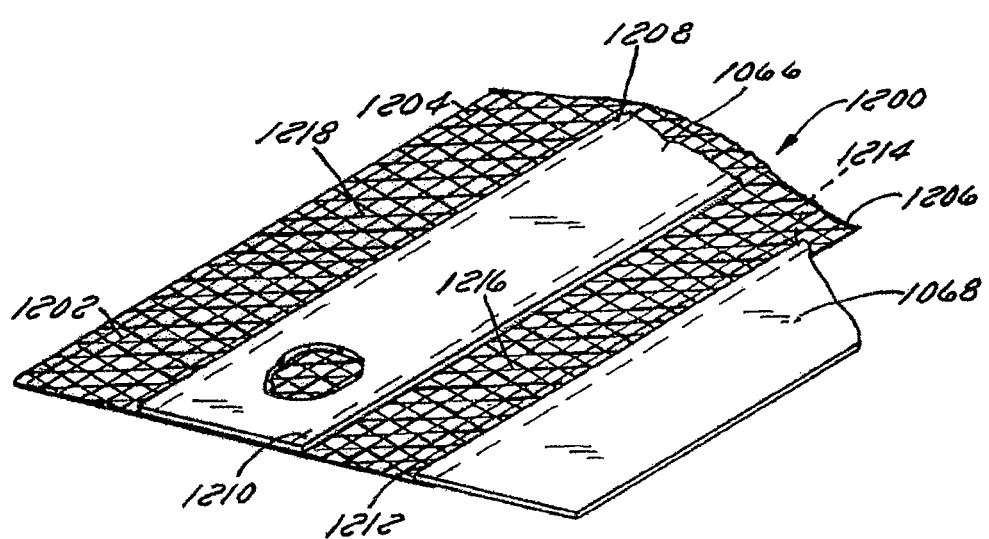
FIG. 24 is a perspective view of a substrate that can be formed into the bag of FIGS. 16-21 using the form, fill and seal machine of FIGS. 22 and 23.

The resulting substrate 1,200 is illustrated in FIG. 24. It includes a continuous strip of mesh fabric 1,202 having one print band 1,066 overlaid onto an outer surface about mid-way between first and second edges 1,204, 1,206 of the mesh strip 1,202. Print band 1,066 is thermally bonded to mesh strip 1,202 at overlap seams 1,208 and 1,210 running parallel to the edges of the print band 1,066. A first edge 1,212 of the other band 1,068 is thermally bonded to the second edge 1,206 of the mesh strip 1,202 via an overlap seam 1,214. When the substrate 1,200 is subsequently formed into a bag, a segment of the first print band 1,066 forms the outer surface of the front side of the bag, a segment of the second print band 1,068 forms the rear side of the bag, a segment of a mesh portion 1,216 between the first and second print bands 1,066 and 1,068 forms the right sidewall of the bag, and a segment of mesh portion 1,218 to the left of the first print band 1,066 forms the left sidewall of the bag.

It should be noted that the substrate 1,200 need not be formed on the vertical form, fill and seal machine 1,050. It could instead be formed by separate converting equipment located either at the same location as the vertical form, fill and seal machine 1,050 or at another location entirely. Optionally forming the substrate at a remote location would offer the bag manufacturer the option of not having to purchase and handle multiple rolls of different types of materials. It also would reduce the capital expense associated with the purchase and operation of the vertical form, fill and seal machine because the machine would not require a substrate forming station.

Referring again to FIG. 22, the product dispenser 1,056 functions to dispense batches of product that have been weighed by a computer-weighing apparatus (not shown) at the proper time in the operating cycle of the machine 1,050. Suitable computer-weighing apparatuses that can perform this function are shown in U.S. Pat. Nos. 4,538,693 and 4,901,807, which are incorporated herein by reference.

Referring to FIGS. 22 and 23, the form fill and seal assembly 1,050 includes a square vertical forming tube 1,080 mounted on the frame 1,052 immediately below the dispenser 1,056, such that product dispensed from the dispenser 1,056 is received internally of the vertical forming tube 1,080. A forming shoulder 1,082 is secured to the frame 1,052 adjacent but spaced from an upper end of the vertical forming tube 1,080. Other polygonal forming tubes or even circular or ovoid tubes could be used in place of a square forming tube. The forming shoulder 1,082 directs the substrate 1,200 around the forming tube 1,080 to form a generally square tubular structure in which the outer edge of the print band 1,068 overlaps the outer surface of the opposed edge of the mesh fabric strip 1,202. A vertical sealing bar 1,084 is supported adjacent the upper end of the vertical forming tube 1,080. The vertical seal bar 1,084 heat bonds the overlapped edge of the print band 1,068 to the outer edge of the mesh fabric strip 1,202 at the corner of front of the finished bag to form a vertical overlap seam, hence forming a generally tubular sleeve 1,087. A pair of advancing belts 1,086, 1,088 is located on opposite sides of the vertical forming tube 1,080 beneath the seal bar 1,084. Belts 1,086, 1,088 are selectively controlled to index the sleeve 1,087 downwardly along the tube 1,080 the length of one bag 1,020 to advance a corresponding amount of the substrate 1,200 and into contact with the forming shoulder 1,082 and enable another bag 1,020 to be formed.

An end sealing and cutting device 1,090 is located beneath the tube 1,080. Device 1,090 includes a pair of opposed heated seal bars 1,092, 1,094 that are selectively movable toward each other to horizontally compress the sleeve 1,087 above the level of the product in the filled bag to form a fin seal that forms the lateral top seam 1,042 in the bag 1,020 containing the product and a lateral bottom seam 1,044 in the next bag 1,020 to be filled with the items. The seam is formed by heating the bonding layers of the various materials so to bond the first and second print strips 1,066, 1,068 to each other and to the intervening layers of mesh strip 1,202, generally as seen in FIG. 23. The device 1,090 also includes a blade (not shown) that severs the filled and sealed bag 1,020 from the remainder of the substrate sleeve 1,087 such that the filled and sealed bag 1,020 falls downwardly onto a conveyor 1,051 which carries the filled and sealed bag 1,020 away from machine 1,050.

Left and right gusseting blades 1,096, 1,098 are provided beneath the discharge opening in the tube 1,080 immediately above the sealing and cutting device 1,090. The blades are driven by actuators such as pneumatic cylinders 1,097 and 1,099 to fold the center of the left and right sides 1,026 and 1,028 of the bag 1,020 between the edges of the front and rear sides 1,022 and 1,024 just prior to closure of the seal bars 1,092, 1,094, thus forming gussets in the sides of the bag 1,020. The blades 1,096, 1,098 are retained in this position during the heating and sealing operation and are retracted simultaneously with the seal bars of the sealing and cutting device 1,090. The depth of the gussets varies with the stroke of the gusseting blades 1,096, 1,098. In the illustrated embodiment, the gussets extend to the center or nearly to the center of the bag 1,020, as can be seen in the bottom view of FIG. 20.

The relatively lightweight, open nature of the ultra-mesh material forming the open mesh material 1,100 of the finished bag 1,020, coupled with the composition of its filaments, permits the vertical form, fill and seal machine 1,050 to produce superior top and bottom seams at a much higher rate than would otherwise be possible with previously known multi-substrate materials having other open mesh materials. The nature of that seam can be appreciated with reference to FIG. 19. The low density material of the various layers melts during the heat sealing process and flows between and around the high density filaments. This results in at least partial encapsulation of the carrier portions of the filaments of the open mesh material layers by the low density material. Importantly, it also permits significant film to film bonding of the outer film layers 1,022 and 1,025 through the openings in the mesh layers 1,026 and 1,028. The ultra-mesh material 1,100 also has a relatively low kinetic coefficients of friction when compared to some other open mesh materials, enhancing the ability to pull substrates containing that mesh material through the machine 1,050 at higher rates without slippage. Tests have shown that multi-substrate VFFS bags with seam strength that is far superior to that present in prior art bags can be manufactured at a rate of 25 bags per minute, or even 50 bags per minute or higher. Comparable multi-substrate VFFS bags employing MS-grade CLAF® as the open mesh material of their substrates can be manufactured at a rate of no more than about 15-22 bags per minute. Tests confirming these conclusions are detailed below.

Referring again to FIGS. 16-18 and 27, the thus-formed, filled, and sealed bag 1,020 is aesthetically pleasing because the film strip of the front side 1,022 lies very smooth on the relatively thin, lightweight underlying open mesh of the layer 1,100 formed from an ultra-mesh material. In addition, the underlying open mesh material 1,100 has higher dimensional stability than traditional knitted and extruded mesh fabrics. Unlike prior knitted and extruded mesh fabrics used in bags, the stability of the open mesh material 1,100, coupled with the geometry of the bag in which the side gussets of the polygonal bag extend nearly to the longitudinal centerline of the bag, constrains the items in the bag to the shape of the bag. The bag 1,020 therefore retains its square, rectangular, or other polygonal shape after it is filled with items. The desired degree of gusseting may vary with, for example, bag sizes. Generally speaking, shallower gusseting is necessary to achieve dimensional stability in larger bags. The bag 1,020 can even stand upright and generally retain its shape.

The superior dimensional stability of form fill and seal bags constructed as discussed herein permits the disclosed bags to retain their desired height and cross sectional shape remarkably well even when filled with products. A bag 1,020 constructed as discussed above in connection with FIGS. 16-21 using the "ultra-mesh A" material as the mesh material is shown after it has been formed, filled, and placed on a flat surface such as a table. Tests have shown that, when that bag is filled to its rated weight with items and placed upon a flat surface, it retains a high percentage of its initial height. The initial height, $H_I$, as defined herein, is the vertical distance between the bottom surface of the bag to the location that will form the upper inside surface after the bag is sealed, as measured just before the bag is filled with items during the forming and filling process. That height can be measured or at least estimated with a reasonable level of precision during the form and fill process by measuring the distance from the bottom of the bag to the bottom end of the fill tube (see FIGS. 22 and 23) prior to introducing items in the bag. The final height, $H_F$, as defined herein, is the vertical distance between the bottom surface of the bag to top of the items within the bag, after the bag has been formed, filled with items, and placed on a surface without being supported from above or the sides. This final height could also be considered the final effective height of the bag since the interior area of the bag above the product is effectively wasted. Tests have revealed that the final height $H_{FI}$ of bag 1,020 is least 35% of the initial height. In fact, the final height $H_{FI}$ has been found to be more than 50%, and even more than 60% of the initial height $H_I$ of the bag.

The beneficial effects of this superior dimensional stability can be appreciated with reference to FIG. 27, in which the bag 1,020 is shown side by side with prior art form, fill and seal bags 1,021 and 1,023. The bag 1,021 as made from a tubular net knitted synthetic mesh fabric available commercially from GIRO GH S.A. of Badalona, Spain under the brand name GIRO®. The bag 1,023 was formed from an extruded net fabric available commercially from Conwed Global Netting Solutions, Minneapolis, Minn. under the brand name VEXAR®. FIG. 27 demonstrates that the heights $H_F$ and $H_F$ of the Bags 1,021 and 1,023 are much smaller than the final height $H_F$ of a bag produced in accordance with the present disclosure. The Bags 1,021 and 1,023 "slump" a great deal, whereas there is virtually no slump of a bag constructed in accordance with the present disclosure.

The height retention characteristics depicted visually in FIG. 27 were calculated numerically and recorded for a sample of the new bag. The bags made from both the GIRO® and VEXAR® materials were 2 lb bags containing Clementine oranges. The new bag was a 3 lb bag constructed as discussed herein in conjunction with FIGS. 16-21 and having the "ultra-mesh A" material as its open mesh material. For each bag, the initial and final heights $H_I$ and $H_F$ was measured and recorded, and the height retention percentage $(H_F/H_I) \times 100$ was calculated and recorded. The differences in rated capacity and the nature of the stored items between the new style bag and the prior art bags were not believed to significantly affect the height retention percentage. The results are tabulated in Table 5 below in which the various bags are identified by the mesh material contained in the bag:

TABLE 5

FFS BAG HEIGHT RETENTION

| Mesh Type | Initial Bag Height (cm) | Final Bag Height (cm) | Height Retention (%) |
| --- | --- | --- | --- |
| GIRO ® Circular Knit | 36.8 | 8.9 | 24 |
| VEXAR ® Extruded Net | 35.7 | 8.9 | 24 |
| Ultra-Mesh A | 34.9 | 22.9 | 66 |

The measurements recorded in Table 5 confirmed that multi-substrate bags constructed using an ultra-mesh material exhibited dramatically improved height retention than prior art circular knit and extruded net bags.

The dimensional stability of the bag 1,020 is also reflected by its high perimetric stability. "Perimetric stability" as used herein refers to the ability of a bag to maintain a constant cross sectional shape and a constant perimeter value along at least a substantial portion of the length of the bag after it is filled and placed on a surface in an unsupported manner, i.e., without otherwise being supported from above or from beside. It is another measure of "slump". Any VFFS bag will have an initial diameter $D_I$ and resultant initial perimeter that essentially matches those of the tube from which it is formed, and that diameter $D_I$ will be relatively uniform along at least the majority of the length of the bag. A bag with high perimetric stability will exhibit little slump and, therefore, will have a final maximum diameter $D_F$ that is relatively close to the initial maximum diameter of the bag, which can be assumed to be the same as the diameter of the forming tube on VFFS machine. That is the case with the bag 1,020 constructed using the ultra-mesh A material, which in which $D_F/D_f \times 100$ is at least 70% and even 90% or even more. In contrast, $D_F/D_f \times 100$ for the prior art bags made from the prior art GIRO® circular knit material and VEXAR® extruded net materials are typically less than 50%.

The ultra-mesh material also offers excellent ventilation of the goods stored in the bag. The superior seam strength of the bag 1,020 permits larger and/or higher capacity bags to be produced. The ability to form the seams quickly and draw the substrate through the machine permits the bags to be formed and filled at higher rates.

Figure 25:
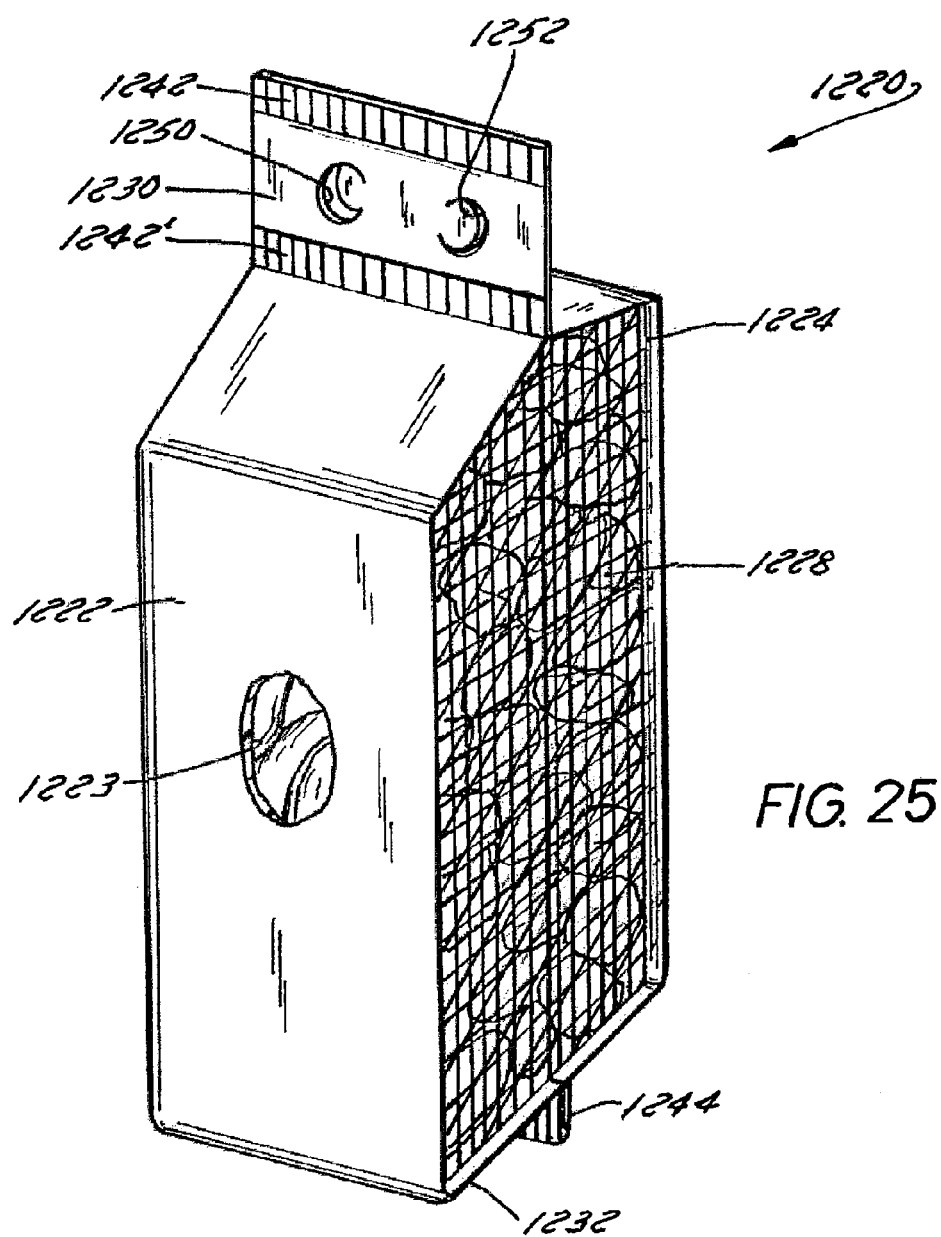
FIG. 25 is a perspective view of a form fill and seal bag constructed in accordance with another embodiment of the present invention.
Figure 26:
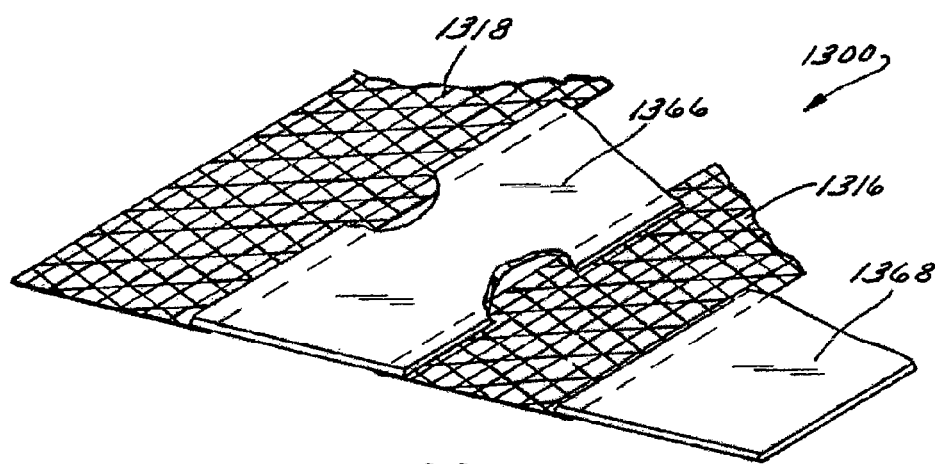
FIG. 26 is a perspective view of a substrate that can be converted into the bag of FIG. 25.

An alternative bag configuration 1,220 is shown in FIG. 25. Bag 1,220 is identical to bag 1,020 of FIGS. 16-21 in all respects except for the fact that the front side 1,222 is formed solely from a thermoplastic film strip 1,202 as opposed to a thermoplastic film strip overlying an open mesh fabric. Note cut away portion 1,223 in FIG. 25. A substrate 1,300 for making that bag, shown in FIG. 26, consists of two spaced strips 1,316 and 1,318 of an ultra-mesh material that are linked to one another by two print bands 1,266, 1,268. The print band 1,266 bridges the gap between the two spaced strips 1,316 and 1,318. Referring again to FIG. 25, the rear side 1,224 and gusseted left and right sides 1,226 and 1,228 are identical to the corresponding sides 1,024, 1,026, and 1,028 of the bag 1,020 of the first embodiment. The seals on the opposed ends of the top and bottom seams 1,242, 1,244 are also identical to those of the bag of the first embodiment along at least the majority of their length.

The bag 1,220 of FIG. 25 also has horizontally spaced finger holes 1,250, 1,252, formed through the bag from front to rear between two spaced seams 1,242, 1,242' near the top of the bag, for permitting the bag to be supported at least in part by inserting one's fingers through the holes. The holes 1,250, 1,252 can be punched through the bag by punches mounted on or otherwise operating in combination with the sealing and cutting device 1,090 of the form fill and seal machine 1,050 or by other equipment entirely. In order to negate the need to handle blanks or plugs that would be produced by removing all of the material from the punched holes, the holes preferably are punched so as to leave flaps. The bag 1,020 of FIGS. 16-21 could also be formed with finger holes, if desired.

Examples

The superiority of the seam strength achieved through the use of the substrate described above was confirmed through several series of tests designed to replicate the end seals formed from fin seams on a bag. Except as otherwise noted, the tested material comprised a 1 in (2.54 cm) wide strip of a layered fabric comprised of first and second opposed outer layers of the above-described PET film material and four intervening layers of the "ultra-mesh material" representing the gusseted area at the ends of a gusseted four-panel bag. The composition of the ultra-mesh material varied from test to test. These strips of material were then clamped between two heated bars, designed to simulate the seal bars of a vertical form, fill and seal machine, at a clamping pressure of 700–710 kPa for specific periods of time or "dwell times". The dwell times varied from test to test. The seam was subsequently pulled apart by pulling the joined materials from above and below until the seam failed, and the maximum applied force and the time required to reach that force after the force was initially applied. Each of these test series and the conclusions drawn from them will now be described.

Test Series 1—Co-Ex/HDPE Mesh, 10 mm

In this series of tests, a substrate having an ultra-mesh material in the form of a non-woven fabric of the type generally illustrated in FIGS. 4-7 above was tested. The fabric had a density of 20 g/m$^2$ and consisted of two warp layers of a co-extruded filament flanking two weft layers of high-density polyethylene (HDPE). The warp filaments extended parallel with the machine direction. The weft filaments extended at included angles of about 40° relative to the cross machine direction. Hence, each filament extended at an angle of about 20° relative to the cross machine direction. Each weft filament was formed from an 80 micron thick tri-layer ribbon having a 50 micron thick layer of HDPE interposed between two 15-micron thick layers of a linear low-density polyethylene LLDPE. The ribbon was stretched at a ratio of 6:1 to form the filaments that were incorporated into the fabric, after which the composite filament had a thickness of about 0.03 mm and a width of about 1.5 mm. The warp filaments of each layer were spaced 10 mm apart. The fabric was an alternating fabric in which the warp filaments of the lower layer were spaced about mid-way between the warp filaments of the upper layer, leading to a warp filament spacing within the fabric of about 5 mm. Each weft layer filament had a thickness of about 0.04 mm and a width of about 1.5 mm. Three samples were tested under conditions that are summarized in Table 6 below:

TABLE 6

CO-EX/HDPE MESH, 10 MM, SEAL CHARACTERISTICS

| Sample | Temp. (° C.) | Dwell Time (Sec.) | Max Force (N) | Time to Max Force (Sec.) |
|---|---|---|---|---|
| 1 | 149 | 0.75 | 6.6 | 0.68 |
| 2 | 149 | 0.75 | 6.2 | 0.46 |
| 3 | 149 | 0.25 | 8.0 | 0.62 |

This series of tests reveals that forming bags under the operational conditions of heat and dwell time required to form acceptable seals in a substrate having an ultra-mesh material as its mesh portion produced a very strong seal. The time required to reach the maximum force, serving as a measure of how quickly the seam was formed, was more than acceptable. Unexpectedly, it was discovered during test No. 3 that reducing the dwell time to only 0.25 seconds actually produced a stronger seal of 8.0 N.

Test Series 2—Co-Ex/Co-Ex Stacked, 8 mm

The open mesh material of the substrate of Test Series 2 was similar in construction to that shown in FIGS. 1-3. It consisted of an ultra-mesh material formed from two aligned or "stacked" warp filaments flanking crossing weft filaments. Both the warp filaments and the weft filaments were co-extruded tri-layer filaments of the type described above in conjunction with Test Series 1. The warp filaments were spaced from one another by 8 mm. The results of the tests are summarized in Table 7 below:

TABLE 7

CO-EX STACKED, 8 MM SEAL CHARACTERISTICS

| Sample | Temp (° C.) | Dwell Time (Sec.) | Max Force (N) | Time to Max Force (Sec.) |
|---|---|---|---|---|
| 1 | 149 | 0.25 | 5.5 | 0.48 |
| 2 | 149 | 0.17 | 4.5 | 0.22 |
| 3 | 149 | 0.10 | 3.7 | 0.35 |
| 4 | 143 | 0.10 | 5.5 | 0.39 |
| 5 | 138 | 0.10 | 6.6 | 0.45 |
| 6 | 138 | 0.10 | 6.6 | 0.38 |

These tests revealed that the excellent fin seam strengths commensurate with those observed in Test Series 1 were obtained at even smaller dwell times and reduced temperatures. Being able to produce seams of these high strengths with dwell times on the order of only 0.10 second would easily permit the production of vertical form, fill and seal bags on the machine described above at rates in excess of 50 bags per minute.

Test Series 3—Co-Ex/HDPE Mesh, 10 mm

In Test Series 3, the same ultra-mesh material tested in Test Series 1 was tested at reduced temperatures and reduced dwell times. The results are summarized in Table 8:

TABLE 8

CO-EX/HDPE MESH, 10 MM SEAL CHARACTERISTICS

| Sample | Temp. (° C.) | Dwell Time (Sec.) | Max Force (N) | Time to Max Force (Sec.) |
|---|---|---|---|---|
| 1 | 149 | 0.10 | 6.6 | 0.28 |
| 2 | 132 | 0.10 | 6.6 | 0.42 |
| 3 | 132 | 0.10 | 6.2 | 0.39 |
| 4 | 127 | 0.10 | 1.8 | 0.27 |

Unexpectedly, it was observed that very strong fin seals having failure forces in excess of 6.0 N were found at a dwell time of only 0.10 second at temperatures as low as 132° C. A significant reduction in seam strength was noted only at temperatures below 130° C.

Test Series 4—Pre-Labeled Co-Ex/HDPE Mesh, 10 mm

The substrate tested in this series of tests was identical to the ultra-mesh material that was tested in Test Series 1 and 3 above, except for the fact that the substrate was "pre-labeled" with a 3.0 PET laminate material having a thickness of 3.0 mil (0.076 mm). That is, the strips of film material were attached to the ultra-mesh material using separate converting equipment rather than in the converting equipment used in the vertical form, fill and seal machine described above. The results of the testing are summarized in Table 9 below:

TABLE 9

PRE-LABELED CO-EX/HDPE MESH, 10 MM SEAL CHARACTERISTICS

| Sample | Temp (° C.) | Dwell Time (Sec.) | Max Force e (N) | Time to Max Force (Sec.) |
|---|---|---|---|---|
| 1 | 149 | 0.10 | 5.6 | 0.32 |
| 2 | 149 | 0.10 | 11.0 | 0.57 |
| 3 | 149 | 0.10 | 6.0 | 0.35 |
| 4 | 149 | 0.10 | 5.4 | 0.45 |

These tests confirmed that seam strengths commensurate with those discussed above can be obtained with pre-labeled substrates at bag production rates commensurate with those discussed above in conjunction with Test Series 1 and 3.

4. Multi-Substrate Bags

As indicated above, open mesh materials described herein can be used to make the mesh portions of multi-substrate bags having both film and open mesh portions. "Multi-substrate bags" are bags having opposed first and second side walls in which at least a substantial part of one of the side walls is made from an open mesh material and at least a substantial part of the other side wall is made from a sheet material. The first and second side walls may be sealed directly to each other or may be interconnected by additional side walls spanning gaps between first and second side walls.

Turning now to FIGS. 28-35 and initially to FIGS. 28-30 in particular, a bag 2,020 constructed in part from an open mesh material comprises a s bag having front and rear faces 2,022 and 2,024, left 2,026, and right 2,028 edges, and upper 2,030 and lower 2,032 ends. The mating faces of the side edges 2,026 and 2,028 are formed from bonded fin seams but could be formed from overlap or other seams. At least a substantial portion of the first side wall 2,022 of the bag 2,020 is formed from a strip 2,034 of an open mesh material. A reinforcing strip 2,036 may be provided at the upper edge of the first side wall 2,022 to reinforce the upper edges of the side seams 2,026, 2,028, thereby inhibiting the seams 2,026, 2,028 from splitting during a bag filling operation and subsequent handling.

Referring now to FIGS. 28-30, the second side wall 2,024 of the illustrated embodiment is formed entirely of a sheet material. Alternatively, a mesh strip could be provided within the second side wall of the bag between the upper and lower ends 2,030 and 2,032. As yet another alternative, the entire bottom portion of the second side wall 2,024 could be formed as the same or a different open mesh material of the first side wall 2,022, and the upper portion could be formed of a sheet material. In this case, the first and second side walls could be of at least generally the same construction. Regardless of the construction of the second side wall 2,024, ventilation or breather holes 2,025 may be formed in the sheet material, if desired.

One or more of the ultra-mesh materials of the type described in Section 1 above, including but not limited to, one or more of the materials illustrated in FIGS. 1-7, is well-suited for the mesh material.

The film strip forming the second side wall 2,024 is formed from a sheet material, such as a film material. One such film material is formed at least in part from a synthetic resin film material, such as polyethylene or polypropylene, numerous types of which are commercially available. An example is a co-extruded tri-layer film having an outer layer formed from LLDPE, a center layer formed from a LLDPE blend, and an inner layer formed from a premium LLDPE. The film can be converted into bags easily using existing bag making equipment and can be handled well by existing bag filling machines. It is also FDA compliant for direct food contact. It also can be tinted or colored as desired and can receive print indicia on its outer surface. Another example film is 2.25 mil (0.057 mm) LDPE with an EVA additive.

The thickness of the film will vary with the type of film and the intended application, including the size of the bag in which the film is intended to be used. For a tri-layer coextruded film of the type described above, the film will typically have a thickness of about 1.35 mil. (0.034 mm) to 1.5 mil. (0.38 mm) for a 5 lb bag and about 1.65 mil. (0.042 mm) to about 1.75 mil. (0.44 mm) for a 10 lb bag.

The particular horizontal and vertical dimensions of the side walls 2,022, 2,024, as well as their thicknesses, are typically determined based on the expected weight and size of produce to be packed into the bag by automatic produce packing machinery. It should be noted that bag "sizes" are generally referred to in the art in terms of their storage capacity in lb. Hence, a "5 lb bag" of a given style is one that is sized to hold 5 lbs (2.27 kg) of a particular item or type of item. The chart below gives exemplary dimensions for various bag sizes:

| PRODUCE WEIGHT | BAG WALL DIMENSION |
|---|---|
| 2 lbs (0.91 kg) | 10 in (25.4 cm) by 16 in (40.6 cm) |
| 3 lbs (1.4 kg) | 10 in (25.4 cm) by 16 in (40.6 cm) |
| 4 lbs (1.8 kg) | 10 in (25.4 cm) by 18 in (45.7 cm) |
| 5 lbs (2.3 kg) | 10 in (25.4 cm) by 18 in (45.7 cm) |
| 10 lbs (4.5 kg) | 11.5 in (26.7 cm) by 23 in (58.4 cm) |

The vertical side seams 2,026, 2,028 may be of any desired width depending on holding strength desired for the bag 2,020 along its vertical side seams. Widths on the order of ⅜ in (0.95 cm) to ⅝ in (1.59 cm) are typical. The joining of the side walls 2,022 and 2,024 at seams 2,028 may be done by any suitable bonding or sealing technique, such as heat, glue, sealant, or the like using any of a number of existing bag making machines. Thermal bonding is preferred.

Figure 35:
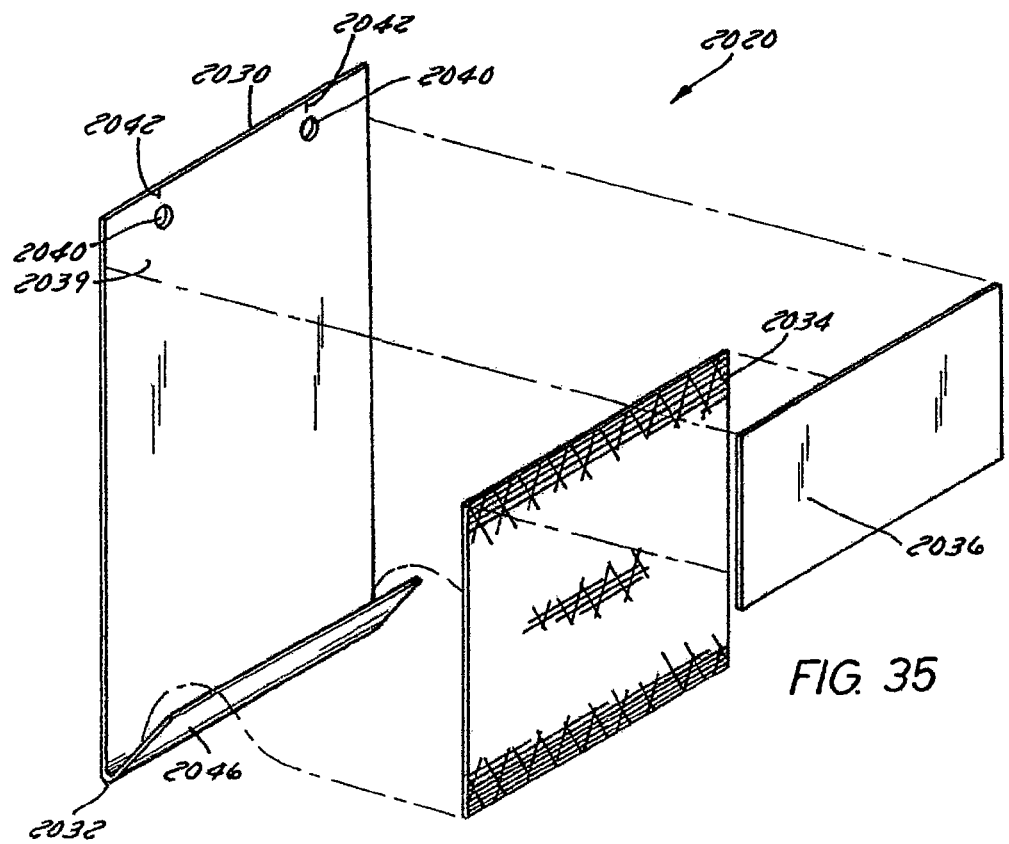
FIG. 35 is an exploded perspective view of the bag of FIGS. 28-31.
Figure 33:
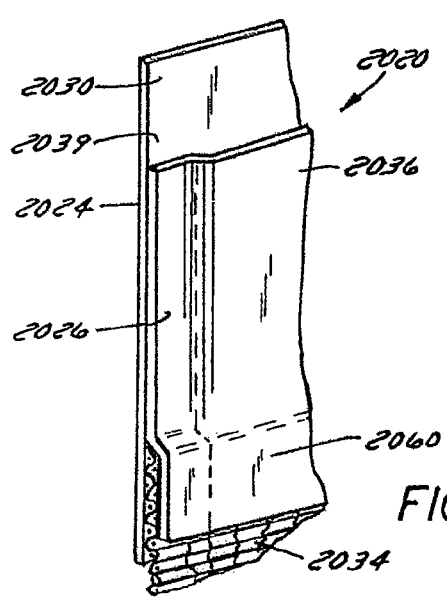
FIG. 33 is a fragmentary perspective view showing an upper portion of the bag of FIGS. 28-31.

Referring to FIGS. 31 and 35, the bottom of the film side wall 2,024 extends beyond the bottom of the mesh side wall 2,022 to form a flap 2,046 which is folded back over the outer surface of the mesh side wall 2,022 with a small gap 2,048 being formed between the bottom edge of the mesh strip 2,034 and the bottom 2,032 of the bag 2,020. Flap 2,046 is thermally bonded to the mesh strip 2,034 to form a lower horizontally extending overlap seam 2,050. As a result, the bottom 2,032 of the interior of the bag 2,020 is formed from a fold in the film side wall 2,024 rather than from a seam. The length of flap 2,046 and the extent to which it overlaps the mesh strip 2,034 may vary with the intended application and manufacturer preference. In the illustrated embodiment, the length of the flap 2,046, from the bottom edge 2,032 of the bag 2,022 to the top of the flap 2,046, is about 3.5 in (8.9 cm). It overlaps the mesh strip by about 1.25 in (3.2 cm).

Alternatively, the mesh strip 2,234 could extend to nearly the bottom of the bag 2,220 as seen in FIG. 31B or could extend even further up the front face of the bag 2,220 than is illustrated in FIG. 31. The bag 2,220 of the embodiment of FIG. 31B otherwise is identical to the bag of FIGS. 28-31 and 32-35. The elements of this embodiment therefore are designated by the same reference numerals as the elements of the embodiment of FIGS. 28-31 and 32-35, incremented by 100. The same incrementing technique is used throughout to designate corresponding portions of the various embodiments.

Providing at least the extreme bottom of the bag from a folded resin film pouch considerably strengthens the bag 2,020 and substantially reduces the chances of failure during a bag filling operation and subsequent handling because the articles falling into the bag impact against the relatively strong fold as opposed to a relatively weak seam. However, this particular bottom configuration is not critical. For example, more conventional flush-type seams of the type disclosed, e.g., in U.S. Pat. No. 3,554,368 or bead-type seams of the type disclosed, e.g., in U.S. Pat. No. 3,123,279 could also be utilized.

Wicket holes 2,040 may be formed in an extension of one of the side walls to permit the bag 2,020 to be hung with wicket pins of commercially available automatic produce bag filling equipment, available, e.g., from Ag-Pak, Inc. of Gasport, N.Y. or Volm Companies of Antigo, Wis. The wicket holes 2,040 should be arranged to cooperate with wicket pins so as to permit the bag 2,020 to be suspended in an automatic produce packing machine as it is filled with produce or another product. The size, location, and number of the wicket holes 2,040 is based upon the nature of the particular bag filling machine with which the bags are to be used. A typical wicket hole is approximately ⅝ in (1.6 cm) in diameter. The side of the bag that is opposite the wicket hole-bearing side is usually considered the front of the bag because that side faces outward when the bag is being filled. In the illustrated embodiment in which the mesh side wall 2,022 forms the front of the bag 2,020, the wicket holes 2,040 are formed in a portion 2,039 of the film side wall 2,024 that extends above the top of the reinforcing strip 2,036 (see FIGS. 28, 29, and 35). The portion 2,039 also could be formed either from a separate strip or integrally with the remainder of the film side wall 2,024. Alternatively, referring to FIG. 31A, the wicket holes 2,140 also could be formed in the reinforcing strip 2,136, in which case the reinforcing strip 2,136 would preferably extend above the top of the film side wall 2,124 of the bag 2,120.

Referring again to the bag of FIGS. 28-30, slits or leaders 2,042 may be cut above the wicket holes 2,040 to assist in removal of the bag 2,020 from the wicket pins of the filling machine once the bag 2,020 is filled.

The wicket holes 2,040 could be eliminated altogether if the bag 2,020 is to be filled manually or via bagging equipment lacking wicket pins. Instead of or in addition to having wicket holes, the top of a bag 2,320 could be formed with draw sleeves 2,360, 2,362 as seen in FIG. 31C. Each of the draw sleeves 2,360 and 2,362 of the embodiment is formed of a comparable synthetic resin film to that of the rear side wall 2,324. The sleeves could be formed integrally with the film strip of wall 2,324 and the reinforcing strip 2,336, respectively, or could be thermally bonded or otherwise affixed to the upper ends of those strips. Each draw sleeve 2,360, 2,362 is formed by folding an extension of the associated resin strip downwardly and outwardly to form a fold. A draw tape or band 2,364, 2,366 is retained in each of the draw sleeves 2,360, 2,362. End portions of each draw band 2,364, 2,366 are bonded or sealed within the associated sleeve 2,360, 2,362. The draw bands 2,364, 2,366 may be accessed via notches or openings (not shown) in the central portions of the draw sleeves 2,360, 2,362 and pulled to close the bag 2,320 at its top.

The reinforcing strip 2,036 may be formed from any of a number of sheet materials. It preferably is formed from the same material as the rear side wall 2,024. Referring to FIGS. 28, 29, 31, 33, and 35, the reinforcing strip 2,036 has a horizontal length that equals the width of the bag 2,020, a vertical width W, a top edge, a bottom edge, and a pair of side edges. The reinforcing strip 2,036 overlaps the outer surface of an upper edge of the mesh strip 2,034 of the bag sufficiently to permit the reinforcing strip 2,036 to be joined to the mesh strip 2,034 through an upper horizontal seam 2,060 positioned well beneath the top edge of the reinforcing strip but positioned very near the upper edge of the mesh strip 2,034. (It could alternatively be positioned between the walls 2,022 and 2,024, in which case it would engage the inner surface of the mesh strip 2,034.) The vertical width of the overlap need not be any longer than is necessary to permit the formation of an adequate bond between the reinforcing strip 2,036 and the mesh side wall 2,022. Since seams are typically on the order of ½ in (1.27 cm) to ⅜ in (1.0 cm) wide, the width of the overlap need not be significantly more than ⅜ in (1.0 cm) to ½ in (1.3 cm). It should be noted, however, that the width of overlap could be considerably greater without departing from the scope of the present disclosure. A wider overlap permits the printing of indicia on the upper portion of the mesh side of the bag. In the illustrated embodiment of a 5 lb produce bag, the reinforcing strip 2,036 extends about 5½ in (14.0 cm) above the mesh strip 2,034. The exposed length of the mesh strip 2,034, between the bottom of reinforcing strip 2,036 and the top of fold 2,046, is about 8 in (20.3 cm).

Referring once again to the drawings of the bag of FIGS. 28-31 and 32-35, and particularly to FIG. 34, the open mesh material used in the bag 2,020 is formed from both weft and warp layers of a coextruded material as described above in conjunction with FIGS. 4-7. The weft filaments cross at an included angle α of about 25°-35° relative to the vertical or cross machine direction, or and, more typically, of about 30°. Hence, each individual filament extends at an acute angle of about 7.5°-10° relative to the cross machine direction. Each diamond of the pattern has a width "W" of about 38 to 42 mm and, more typically of about 40 mm and a height "H" of about 16 to 18 mm and, more typically, of about 17 mm. The warp filaments are of an "alternating" configuration as described above with the filaments of each layer being spaced from one another by about 8 mm, providing an approximately 4 mm filament-to-filament spacing when viewed through the depth of the fabric.

Figure 36:
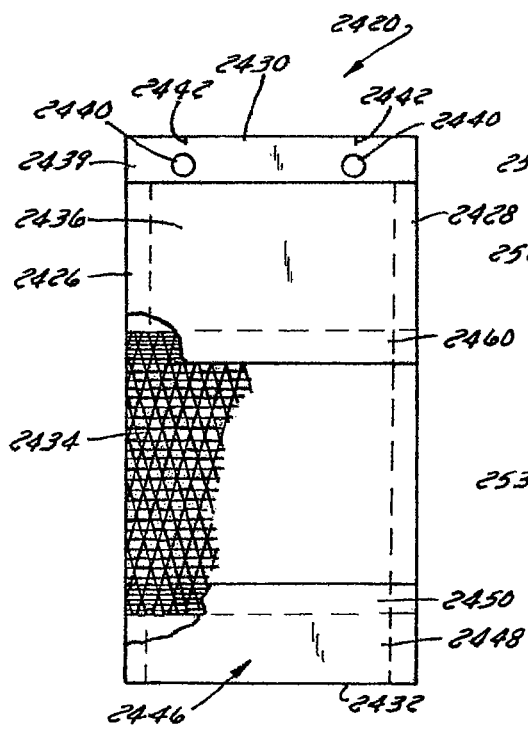
FIG. 36 is a rear elevation view of a bag constructed in accordance with yet another embodiment of the invention.

Turning now to FIGS. 36 and 37, a bag 2,420 is shown that is constructed using an alternative open mesh fabric that is generally the same as the open mesh material described above in connection with FIGS. 28-31 and 35. The height H, width W, and included angle α of the diamonds formed by the crossing weft filaments is the same as disclosed in conjunction with FIG. 34. The alternating warp layers of the fabric are spaced approximately 4 mm apart throughout the majority of the length of the strip when viewed through the depth of the fabric. However, extra filaments or threads are provided at the ends of the mesh strip 2,434 at the lower and upper horizontal seams 2,450 and 2,460 where the mesh strip 2,434 is overlapped by and is sealed to the flap of the film side wall and reinforcing strip 2,436, respectively. In these areas, the number of warp filaments is doubled so that the spacing between adjacent filaments, when viewed through the depth of the mesh fabric strip 2,434, is reduced from approximately 4 mm to approximately 2 mm, increasing the surface area available for bonding and increasing the seam strength at the top and the bottom of the mesh strip 2,434.

Figure 38:
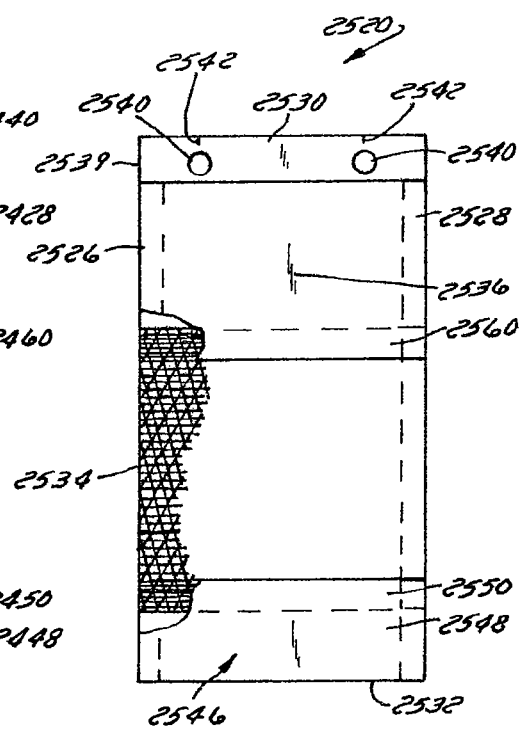
FIG. 38 is a front elevation view of a bag constructed in accordance with yet another embodiment of the invention.

As mentioned above in conjunction with the discussion of the ultra-mesh material, the angles and dimensions of the diamonds formed by the crossing weft filaments can be optimized for the desired application. In order to highlight this fact, another alternative construction of a bag 2,520 is illustrated in FIGS. 38 and 39. Bag 2,520 is identical to the bag 2,420 of FIGS. 36 and 37 (including the provision of additional warp filaments in the areas of the seams 2,550 and 2,560) except for the fact that the weft filaments of the open mesh fabric strip 2,534 extend at a shallower angle relative to the machine direction, rendering a slightly more open mesh structure and improving viewability and ventilation while potentially reducing the seam strength. The weft filaments cross at an included angle α of about 40°-50° relative to the vertical or cross machine direction and, more typically, of about 46°. Each individual filament thus extends at an angle of 20°-25° relative to the cross machine direction. Each diamond of the pattern has a width of about 38 to 42 mm and, more typically of about 40 mm and a height of about 11 to 13 mm and, more typically, of about 12 mm.

Experimental Data

Several variations or styles of multi-substrate bags have been constructed and tested for various characteristics. The bags were subjected to several different tests and compared to prior art bags subjected to the same tests. The testing procedures and the test results will now be detailed.

1. Drop Test

The purpose of a drop test is to determine the seam strength of a bag by dropping the bag from a given height a number of times. Each bag is considered to pass the test if all of its seams survive the maximum number of drops (25 in the procedure employed by the testers) without any of the seams failing. The bags were filled with balls to the rated weight and dropped from a height of 20 in (50.8 cm). A bag was considered to fail if, after any drop, any of its seams tore or ruptured to a length of more than 1 in (2.5 cm). Each bag style was given a grade of A-F depending on the average number of drops that the bag style survived without seam failure. Bag styles surviving an average of nearly 25 drops were given a grade of "A"; bag styles failing within the first four drops were given a grade of "F". Grades of C-D were assigned on a linear basis between these two extremes.

2. Peel Test

The peel test is another, more subjective method of testing seam strength. Each type of seam (side, upper horizontal, and lower horizontal) is tested by manually pulling the mesh and film materials of a statistically significant number of each bag style apart at generally right angles or greater. If the open mesh material peeled away from the sheet relatively easily, the bag was deemed to fail the peel test. The ease with which the seams can be peeled apart was graded on an A-F basis.

3. Pull Test

The pull test is used to test upper horizontal and lower horizontal overlap seams of a bag by manually pulling both the open mesh material and sheet materials apart in opposite directions in the same plane. If the open mesh material sheered away from the sheet material relatively easily, the bag was deemed to fail the pull test. The average ease with which the seams could be pulled apart for each bag style was graded on an A-F basis.

The following bag styles were tested.

Bag Style A: 10 lb. Multi-Substrate Bag with HDPE/Co-Ex, 46° Included Angle

In this series bags constructed as described above in conjunction with FIGS. 28-31 and 32-35 were tested. The bags were dimensioned to store 5 lbs (2.2 kg) of items. The open mesh material of the mesh strip was an ultra-mesh material in the form of a non-woven fabric generally of the type illustrated in FIGS. 1-3 above, having a mass per unit area of 17 g/m$^2$ and consisted of two warp layers of a co-extruded filament flanking two weft layers of high-density polyethylene (HDPE). The diamonds formed by the weft filaments extended at included angles of about 46° relative to the vertical or cross machine direction. Each weft filament was formed from an 80 micron thick tri-layer ribbon having a 50 micron thick layer of HDPE interposed between two 15-micron thick layers of a linear low-density polyethylene LLDPE. The ribbon was stretched at a ratio of 6:1 to form the filaments that were incorporated into the fabric, after which the composite filament had a thickness of about 0.03 mm and a width of about 1.2 mm. The warp filaments of each layer were spaced 8 mm apart. The fabric was an alternating fabric in which the warp filaments of the lower layer were spaced about mid-way between the warp filaments of the upper layer, leading to a warp filament spacing within the fabric of about 4 mm Each weft layer filament had a thickness of about 0.04 mm and a width of about 1.5 mm.

The film used to make the sheet sections of the bag was a multilayer-coextruded film of the type described above in conjunction with FIGS. 28-31 and 32-35. It has a thickness of 1.75 mil. (0.044 mm).

Bag Style B: 5 lb. Multi-Substrate Bag with HDPE/Co-Ex, 46° Included Angle with Extra Filaments This style bag was identical to Style A except for the fact that extra warp filaments were included in the ultra-mesh material in the area of the upper and lower horizontal seams as discussed above in conjunction with FIGS. 35 and 36. As is standard practice, the film material of the sheet side of the bag and the reinforcing strip was thinner than the corresponding film section on a smaller bag, having a thickness of 1.35 mil. (0.034 mm)

Bag Style C: 10 lb. Multi-Substrate Bag with HDPE/Co-Ex, 46° Included Angle with Extra Filaments This style bag was identical to Style B but was a larger bag, designed to hold 10 lb (4.5 kg) of items.

Bag Style D: 5 lb. Multi-Substrate Bag with HDPE/Co-Ex, 34° Included Angle

This style bag was identical to Style A except for the fact that the included angle of the "diamonds" formed by the crossing weft filaments of the ultra-mesh material was 34° relative to the cross machine direction. The mesh fabric had a mass per unit area of 20 g/m². The warp filaments of the mesh fabric were of a uniform spacing throughout the length of the mesh strip.

Bag Style E: 5 lb. Multi-Substrate Bag with HDPE/Co-Ex, 34° Included Angle with Extra Filaments This style bag was identical to Style D (i.e., the included angle of the "diamonds" formed by the crossing weft filaments of the ultra-mesh material was 34° relative to the cross machine direction) except for the fact that extra warp filaments were included in the open mesh fabric in the area of the upper and lower horizontal seams as discussed above in conjunction with FIGS. 37 and 38. The ultra-mesh material had a mass per unit area of 20 g/m².

Bag Style F: 10 lb. Multi-Substrate Bag with HDPE/Co-Ex, 34° Included Angle with Extra Filaments This multi-substrate bag style was identical to Bag Style E except for the fact that the bags were larger bags, constructed with thicker film in the film sections, and were designed to hold 10 lb (4.5 kg) of items.

Bag Style G: 5 lb. Multi-Substrate Bag with Co-Ex/Co-Ex, 34° Included Angle

This bag is identical to Bag Style A above except for the fact that both the warp and weft filaments of the ultra-mesh material of the multi-substrate bag were formed of a coextruded multilayer material as described above in connection with FIGS. 4-7. Both the warp filaments and the weft filaments were coextruded tri-layer filaments of the type described above in conjunction with Bag Style D. The ultra-mesh material had a mass per unit area of 19.5 g/m². The warp filaments were spaced with one another by 4 mm along the entire length of the mesh strip when viewed through the depth of the fabric.

The peel test, pull test, and drop test of all of these bags are summarized in Table 10 below:

TABLE 10

DROP, PEEL, AND PULL TEST REULTS

| Bag Style | Bag Size | Mesh Type | Top & Bottom Seals Peel Test | Top & Bottom Seals Pull Test | Side Seals Peel Test | Side Seals Drop Test | Avg. Drops to Failure | Mesh Mass (g/m²) |
|---|---|---|---|---|---|---|---|---|
| A | 10 lb. | HDPE/Co-Ex, 46° Included Angle | B | B | B | B | 12.8 | 17 |
| B | 5 lb. | HDPE/Co-Ex, 46° Included Angle w/Extra Filaments | B | B | B | B | 23.3 | 17 |
| C | 10 lb. | HDPE/Co-Ex 46° Included Angle w/ Extra Filaments | B | B | B | B | 21.9 | 17 |
| D | 5 lb. | HDPE/Co-Ex, 34° Included Angle | C+ | B− | B | A | 25.0 | 20 |
| E | 5 lb. | HDPE/Co-Ex 34° Included Angle w/Extra Filaments | B | B | A | A | 23.9 | 20 |
| F | 10 lb. | HDPE/Co-Ex, 34° Included Angle w/Extra Filaments | A | A | A | A | 21.5 | 20 |
| G | 5 lb. | Co-Ex/Co-Ex, 34° Included Angle | B+ | B+ | A | A | 24.8 | 19.5 |

The tests confirmed that acceptable seam properties were obtained for all of the listed bags. Particularly good results were obtained with Bag Styles B, C, E, and F, all of which had extra warp filaments in the areas of the upper and lower horizontal seams of the ultra-mesh material. The best results overall seemed to be achieved with Bag Styles E and F, the open mesh material of both of which had extra warp filaments in the areas of the upper and lower horizontal seams and a 34° included angle of crossing weft filaments as discussed above in connection with FIGS. 36 and 37.

Tensile Test Results

The seams of various bag styles were also tested in a tensile tester in order to obtain a more quantifiable test of seam strength. The tensile tester consisted of two jaws spaced 3 in apart. Each bag to be tested was cut into three two inch wide strips containing the upper horizontal seam, the lower horizontal seam, and one of the side seams, respectively. In each test, one of the strips was clamped in the jaws at its opposed ends. The jaws were then pulled apart at a constant rate of 24 in/min (61 cm/min) to emulate the stresses imposed on a bag during a rigorous filling process. The jaws were pulled apart, while monitoring the load on the bag, until the seam failed. Seam failure was as defined by a 20% drop in applied load. The maximum force applied before seam failure was recorded.

The results of these tests are summarized in Table 11 below:

TABLE 11

TENSILE TEST REULTS

| General Bag Style | Bag Description | Bag Size (LBS) | Side Seam Max Force (N) | Upper Horizontal Max Force (N) | Bottom Seam Max Force (N) | Lower Horizontal Seam Mesh Mass/Area (g/m2) |
|---|---|---|---|---|---|---|
| B1 | HDPE/Co-Ex, 46° Included Angle w/ Extra Warp Filaments | 5 | 20.6 | 34.0 | 21.7 | 17.0 |
| B2 | HDPE/Co-Ex, 46° Included Angle w/ Extra Warp Filaments (Retest) | 5 | 21.6 | 38.7 | 27.1 | 17.0 |
| D | HDPE/Co-Ex, 34° Included Angle | 5 | 20.7 | 36.4 | 29.1 | 20.0 |
| E1 | HDPE/Co-Ex, 34° Included Angle w/ Extra Warp Filaments | 5 | 28.3 | 36.9 | 25.6 | 20.0 |
| E2 | HDPE/Co-Ex, 34° Included Angle w/ Extra Warp Filaments (Retest) | 5 | 21.6 | 37.8 | 24.0 | 20.0 |
| G | Co-Ex/Co-Ex, 46° Included Angle | 5 | 25.1 | 33.1 | 25.2 | 19.5 |

It should be noted that not all of the bag styles referenced in Table 11 were strictly identical to any corresponding bag style summarized in Table 10. For instance, the ultra-mesh material of the bag style labeled "HDPE/Co-Ex, 46° Included Angle w/ Extra Warp Filaments" (Bag style B 1) had the extra warp filaments at the lower horizontal seam installed in a "stacked" arrangement with the remaining filaments rather than a "alternating arrangement" as described above in conjunction with Bag Style B. Similarly, the extra warp filaments in the ultra-mesh material of the bags labeled "HDPE/Co-Ex, 34° Included Angle w/ Extra Warp Filaments" (Bag style E) had the extra warp filaments at the lower horizontal seam installed in a "stacked" arrangement with the remaining filaments rather than a "alternating arrangement" as described above in conjunction with Bag Style E.

The tensile testing correlated sufficiently with the drop testing, peel testing, and pull testing to confirm that upper and lower horizontal seams and the side seams of all "new bags" are more than strong enough for their initial purpose. Yet, all of the new bags enjoyed the benefits resulting from the combination of the high dimensional stability, low mass, and high strength-to-mass ratio of the ultra-mesh material described herein. These benefits include reduced carbon footprint, reduced volume for storage and shipment, and enhanced ventilation and viewability.

The higher dimensional stability provided by the ultra-mesh material of strip 2,034, coupled with the higher strength-to-mass ratio, contributes to the possibility of forming bags that have a seam strength that is commensurate with or even superior to that of prior multi-substrate bags while substantially reducing the carbon footprint of the bags both in manufacturing and in the consumption of raw materials.

It also reduces the weight and volume of the bag. The reduced weight reduces shipping costs, further reducing the bag's carbon footprint.

Testing has confirmed that the reduced volume permits significantly more multi-substrate bags to be stored in a given volume and shipped than comparable prior art bags. The testing compared 5 lb "new style" bags constructed pursuant to the present disclosure to 5 lb bags that were identical to those bags except for employing MS-grade CLAF® as the open mesh material, whereas the new style bags used the "ultra-mesh A" material as the mesh portion of the bag. Three bundles of each type of bag were tested, with each bundle containing 250 bags. In each test, the initial or uncompressed height of the stack was measured. A force of 27.1 N was then applied to each stack uniformly along the length of the stack, and the height was again measured. The 27.1 N force was designed to emulate the compressive force typically imposed on a bundle of bags when boxed. A total force of 42.3 N was then applied uniformly along the length of each bundle, and the height was again measured. The averages of the three series of test were then calculated for both bag styles and recorded. The results of these tests are summarized in Table 12 below.

TABLE 12

MULTI-SUBSTRATE BAG STABILITY

| Mesh Type | Pre-Compressed Height (cm) | Number of Bags/cm | Compressed Height @ 27.1 N (cm) | Number of Bags/cm | Compressed Height @ 42.3 N (cm) | Number of Bags/cm |
|---|---|---|---|---|---|---|
| MS-grade CLAF ® | 14.0 | 17.9 | 7.0 | 35.7 | 6.4 | 39.1 |
| Ultra-Mesh A | 12.7 | 19.7 | 6.4 | 39.1 | 5.3 | 47.2 |

Table 12 confirms that, when compressed using a force of a magnitude typically applied to bags when filling boxes, about 10%-40% more new style bags can be can be stored and shipped in a given volume than comparable prior art bags constructed using MS-grade CLAF® as the open mesh material. Multi-substrate bags are typically shipped in boxes that contain four bundles in each box. The improved stackability of bags produced in accordance with this disclosure permits a fifth bundle of bags to be added to each box, reducing shipping costs and the bags' carbon footprint.

The relatively open nature of the mesh fabric also substantially improves ventilation and viewability of the stored items.

Many changes and modifications could be made to the substrates, bags, and production systems and processes disclosed herein without departing from the spirit of the present invention. To the extent that they might not be apparent from the above, the scope of these variations will become apparent from the appended claims.

We claim:

1. A form, fill, and seal bag comprising:
    first and second opposed sides, each of which is formed at least in part from a strip of a sheet material extending lengthwise of the bag from at least one end thereof, wherein at least one portion of the bag is located between strips of the sheet material and is formed from a strip of an open mesh material having a side edge joined to a side edge of one of the strips of sheet material at a vertical seam extending the length of the bag, the open mesh material having a mass per unit area of no more than 30 g/m$^2$,
    an end seam extending across one end of the bag and joining the first and second strips of sheet material together with at least one layer of the open mesh material therebetween, the end seam being formed from a fin seal formed over a dwell time of less than 0.25 seconds and having a strength of at least 2.5 N, where strength is measured in accordance with ASTM standard D 5034.

2. The bag of claim 1, wherein the fin seal is formed over a dwell time of about 0.1 seconds and the seam has a strength of at least 4.0 N.

3. The bag of claim 2, wherein the seam has a strength of at least 6.0 N.

4. The bag of claim 1, wherein the open mesh material has a mass per unit area of no more than 25 g/m$^2$.

5. The bag of claim 1, wherein the open mesh material extends in machine and cross machine directions has a strength to mass ratio in at least one of the machine and cross machine directions of at least 3.30 N/(g/m$^2$).

6. The bag of claim 1, wherein the end seam comprises a first, lower seam, and further comprising a second, upper end seam extending across an upper end of the bag and joining the first and second strips together, the second end seam being formed from a fin seal formed over a dwell time of less than 0.25 seconds and having a strength of at least 2.5 N.

7. The bag of claim 6, wherein the vertical seam is formed from an overlap seal.

8. The bag of claim 6, wherein the bag is a gusseted bag in which the first and second sides are separated from one another by third and fourth gusseted sides formed by the open mesh material.

9. The bag of claim 8, wherein the bag is at least generally polygonal in cross sectional shape along at least the majority of its length after being filled.

10. The bag of claim 8, wherein at least a majority of the first side is formed from a first strip of the sheet material and at least a majority of the second side of the bag is formed from the open mesh material and has a second strip of a sheet material overlaid thereon and thermally bonded to an outer surface of the open mesh material over at least substantially an entire area of the second strip of sheet material.

11. The bag of claim 1, wherein the open mesh material is a non-woven fabric that extends in machine and cross machine directions and that comprises:
    first and second layers formed from individual filaments that cross one another at an acute angle relative to the machine direction; and
    third and fourth layers that are disposed outside of the first layer and the second layer, respectively, each of the third and fourth layers being formed from individual filaments that extend at least generally in parallel with one another in the machine direction,
    wherein the filaments of at least the third and fourth layers are composite filaments having a carrier portion of a relatively high melting point and a bonding portion of a relatively low melting point, the bonding portion of each being thermally bonded to filaments of at least one other layer, wherein the fabric has a strength to mass ratio in at least one of the machine and cross machine directions of at least 2.67 N/(g/m$^2$), where strength is measured in accordance with ASTM standard D 5034.

12. The bag of claim 11, wherein the filaments of each of the third and fourth layers of the fabric are spaced relatively evenly from one another along the entire length of the strip of the fabric.

13. The bag of claim 12, wherein filaments of at least one of the third and fourth layers of the fabric are spaced closer together within the end seam than in a portion of the fabric that is spaced from the end seam.

14. The bag of claim 1, wherein the sheet material is a film material.

15. A filled form, fill, and seal bag comprising:
    an upper end;
    an oppositely disposed lower end, wherein at least the lower end is closed;
    a body that extends between the upper and lower ends to define an interior volume that contains items, the body of the filled bag being at least generally polygonal in transverse cross-sectional shape along at least the majority of its length, the body having at least two opposed sides formed from an open mesh material formed from individual filaments that intersect one another, at least some of the filaments being composite filaments having a carrier portion of a relatively high melting point and a bonding portion of a relatively low melting point, the bonding portion of each filament being thermally bonded to filaments of at least one other layer, the open mesh material having a mass per unit area of no more than 30 g/m$^2$;

the bag having an initial height measured from the lower end to the upper end, wherein the initial height is measured after the lower end is sealed and after the body is formed but prior to the items being placed into the bag; and the bag having a final height, measured from the lower end to the upper level of items in the bag, that is at least 35% of the initial height, wherein the final height is measured after the items are placed into the bag and after the bag is placed on a horizontal surface and left unsupported from above.

16. The filled bag of claim 15, wherein the final height of the bag is at least 50% of the initial height.

17. The filled bag of claim 16, wherein the final height of the bag is at least 60% of the initial height.

18. The filled bag of claim 15, wherein the bag is filled with produce items.

19. The filled bag of claim 15, wherein the items occupy at least 50% of the interior volume of the bag.

20. The filled bag of claim 15, wherein the bag is at least substantially rectangular in transverse cross sectional shape along at least the majority of its length and has an at least substantially rectangular bottom.

21. The filled bag of claim 15, wherein the open mesh material extends in machine and cross machine directions, and wherein the open mesh material has a strength to mass ratio in at least one of the machine and cross machine directions of at least 2.67 N/(g/m$^2$).

22. A form, fill, and seal bag comprising:
first and second opposed sides, each of which is formed at least in part from first and second strips of a sheet material extending lengthwise of the bag from at least one end thereof, wherein at least one portion of the bag is located between strips of the sheet material and is formed from a strip of an open mesh material formed from individual filaments that intersect one another, at least some of the filaments being composite filaments having a carrier portion of a relatively high melting point and a b ding portion of a relatively low melting point, the bonding portion of each filament being thermally bonded to filaments of at least one other layer, the open mesh material having a mass per unit area of no more than 20 g/m$^2$ and a burst strength of at least 80 kPa, where burst strength is measured in accordance with ASTM standard D 3786, first and second end seams extending across one end of the bag and joining the first and second strips together with at least one layer of the open mesh material therebetween.

23. The bag of claim 22, wherein the end seams are formed from a seal having a strength of at least 2.5 N.

24. The bag of claim 23, wherein each of the end seam seals is a fin seal.

25. The bag of claim 22, wherein the open mesh material extends in machine and cross machine directions, and wherein the open mesh material has a strength to mass ratio in at least one of the machine and cross machine directions of at least 2.67 N/(g/m$^2$).

26. A form, fill, and seal bag comprising:
first and second opposed sides, each of which is formed at least in part from a strip of a sheet material extending lengthwise of the bag from at least one end thereof, wherein at least one portion of the bag is located between strips of the sheet material and is formed from an open mesh material comprising individual filaments that intersect one another, at least some of the filaments being composite filaments having a carrier portion of a relatively high melting point and a bonding portion of a relatively low melting point, the bonding portion of each composite filament being thermally bonded to other filaments at at least some points of intersection, wherein the open mesh material extends in machine and cross machine directions, and wherein the open mesh material has a mass per unit area of less than 30 g/m$^2$ and a breaking elongation in at least one of the machine and cross machine directions of no more than about 50%, where breaking elongation is measured in accordance with ASTM standard D 5034;

an end seam extending across one end of the bag and joining the first and second strips together with at least one layer of the open mesh material therebetween.

27. The bag of claim 1, wherein the open mesh material comprises individual filaments that intersect one another, at least some of the filaments being composite filaments having a carrier portion of a relatively high melting point and a bonding portion of a relatively low melting point, the bonding portion of each composite filament being thermally bonded to other filaments at at least some points of intersection.

28. The bag of claim 15, wherein the open mesh material is a non-woven fabric that extends in machine and cross machine directions, and wherein the filaments include
first and second layers of individual filaments that cross one another at an acute angle relative to the machine direction; and
third and fourth layers of individual filaments that are disposed outside of the first layer and the second layer, respectively, the filaments of each of the third and fourth layers extending at least generally in parallel with one another in the machine direction,
wherein the composite filaments form at least some of the filaments of at least the third and fourth layers, wherein the fabric has a strength to mass ratio in at least one of the machine and cross machine directions of at least 2.67 N/(g/m$^2$), where strength is measured in accordance with ASTM standard D 5034.

29. The bag of claim 22, wherein the open mesh material is a non-woven fabric that extends in machine and cross machine directions, and wherein the filaments include
first and second layers of individual filaments that cross one another at an acute angle relative to the machine direction; and
third and fourth layers of individual filaments that are disposed outside of the first layer and the second layer, respectively, the filaments of each of the third and fourth layers extending at least generally in parallel with one another in the machine direction,
wherein the composite filaments form at least some of the filaments of at least the third and fourth layers, wherein the fabric has a strength to mass ratio in at least one of the machine and cross machine directions of at least 2.67 N/(g/m$^2$), where strength is measured in accordance with ASTM standard D 5034.

30. The bag of claim 26 wherein the open mesh material is a non-woven fabric that extends in machine and cross machine directions, and wherein the filaments include first and second layers of individual filaments that cross one another at an acute angle relative to the machine direction; and third and fourth layers of individual filaments that are disposed outside of the first layer and the second layer, respectively, the filaments of each of the third and fourth layers extending at least generally in parallel with one another in the machine direction, wherein the composite filaments form at least some of the filaments of at least the third and fourth layers, wherein the fabric has a strength to mass ratio in at least one of the machine and cross machine directions of at least 2.67 N/(g/m$^2$), where strength is measured in accordance with ASTM standard D 5034.

* * * * *

UNITED STATES PATENT AND TRADEMARK OFFICE
CERTIFICATE OF CORRECTION

PATENT NO. : 9,630,375 B2
APPLICATION NO. : 13/798596
DATED : April 25, 2017
INVENTOR(S) : Frei et al.

It is certified that error appears in the above-identified patent and that said Letters Patent is hereby corrected as shown below:

In the Claims

Claim 15, Line 28        Replace "hag" with "bag"
Column 39, Line 21

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*